US010919237B2

United States Patent
Stone et al.

(10) Patent No.: US 10,919,237 B2
(45) Date of Patent: Feb. 16, 2021

(54) PICK AND PLACE END EFFECTOR

(71) Applicant: The Boeing Company, Chicago, IL (US)

(72) Inventors: Paul R. Stone, Federal Way, WA (US); William R. Taylor, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 636 days.

(21) Appl. No.: 15/606,863

(22) Filed: May 26, 2017

(65) Prior Publication Data
US 2018/0339463 A1 Nov. 29, 2018

(51) Int. Cl.
| | |
|---|---|
| B29C 65/00 | (2006.01) |
| B29C 70/38 | (2006.01) |
| B29C 70/44 | (2006.01) |
| B23B 31/30 | (2006.01) |
| B25J 15/06 | (2006.01) |
| B25B 11/00 | (2006.01) |
| B32B 37/10 | (2006.01) |

(52) U.S. Cl.
CPC ...... *B29C 66/82423* (2013.01); *B23B 31/307* (2013.01); *B25B 11/005* (2013.01); *B25J 15/0616* (2013.01); *B29C 70/38* (2013.01); *B29C 70/443* (2013.01); *B32B 37/1018* (2013.01); *B29C 65/00* (2013.01); *B29C 66/8242* (2013.01)

(58) Field of Classification Search
CPC ....... B29C 70/44; B29C 70/38; B29C 70/443; B29C 66/82423; B29C 66/8242; B30B 5/02; B30B 9/22; B32B 37/10; B32B 37/1009; B32B 37/1018; B32B 38/1858; B23B 31/307; B25J 15/0616
See application file for complete search history.

(56) References Cited

U.S. PATENT DOCUMENTS

| | | | |
|---|---|---|---|
| 6,179,956 B1* | 1/2001 | Nagahara | B24B 37/30 156/345.14 |
| 2011/0214807 A1* | 9/2011 | Muramoto | B32B 37/0015 156/273.3 |
| 2013/0025114 A1* | 1/2013 | Mizubata | H01L 21/6838 29/559 |

FOREIGN PATENT DOCUMENTS

CN 1777832 B * 5/2010 ........... B65G 49/061

OTHER PUBLICATIONS

Machine translation of CN-1777832-B (Year: 2010).*
"VAC-MAT vacuum clamping system," Witte Barskamp KG, copyright 2017, 4 pages. https://www.witteasia.com/products/vacuum-clamping-technology/vac-mat.php.
"Witte VAC-MAT™," Vacuum Clamping Systems, Main Catalogue, Witte Barskamp KG, copyright 2016, pp. 26-31. https://media.witte-barskamp.com/cms-katalog/en/vacuum/index.html.
"Operating Instructions: Vacuum Clamping Chuck VAC-MAT™," Doc-ID: Witt-7444, Horst Witte Gerätebau Barskamp e.K., Aug. 2009, 33 pages. https://media.witte-barskamp.com/cms-downloads/en/VAC-MAT_EN.pdf.

* cited by examiner

*Primary Examiner* — Christopher T Schatz
(74) *Attorney, Agent, or Firm* — Yee & Associates, P.C.

(57) ABSTRACT

An end effector comprises a plurality of vacuum ports. The plurality of vacuum ports is formed from a plurality of hollow protrusions extending from a face of the end effector. The plurality of vacuum ports is connected to a vacuum chamber receiving a vacuum from a vacuum source interface.

32 Claims, 16 Drawing Sheets

PICK AND PLACE END EFFECTOR

BACKGROUND INFORMATION

1. Field

The present disclosure relates generally to manufacturing and, more specifically, to pick and place movement of composite materials. Still more particularly, the present disclosure relates to an end effector configured to pick and place composite tape.

2. Background

Composite materials are tough, light-weight materials created by combining two or more functional components. For example, a composite material may include reinforcing fibers bound in a polymer resin matrix. The fibers may be unidirectional or may take the form of a woven cloth or fabric.

In manufacturing composite structures, layers of composite material are typically laid up on a tool. The layers may be comprised of fibers in sheets. These sheets may take the form of fabrics, tape, tows, or other suitable forms. In some cases, a resin may be infused or pre-impregnated into the sheets. These types of sheets are commonly referred to as prepreg.

Composite prepreg tape is sticky at room temperature. Composite prepreg tape is desirably sticky so that it sticks to a layup location. When the composite prepreg tape is warm enough to stick to the layup location, the composite prepreg tape also sticks to the vacuum cup of conventional pick and place equipment.

Chilling composite prepreg tape reduces the stickiness of the tape. The composite prepreg tape can be chilled so it does not stick to the vacuum cup of conventional pick and place equipment. However, when the composite prepreg tape is chilled, it also does not stick to the layup location when the composite prepreg tape is placed. Therefore, it would be desirable to have a method and apparatus that takes into account at least some of the issues discussed above, as well as other possible issues.

SUMMARY

An illustrative embodiment of the present disclosure provides a method. A first portion of a first face of a composite material is held against a plurality of hollow protrusions of an end effector using a vacuum supplied to the hollow protrusions of the end effector. Pneumatic pressure is applied to the first face of the composite material to remove the composite material from the plurality of hollow protrusions.

Another illustrative embodiment of the present disclosure provides an end effector. The end effector comprises a plurality of vacuum ports. The plurality of vacuum ports is formed from a plurality of hollow protrusions extending from a face of the end effector. The plurality of vacuum ports is connected to a vacuum chamber receiving a vacuum from a vacuum source interface.

A further illustrative embodiment of the present disclosure provides a system configured to lift composite material. The system comprises a robotic arm and an end effector connected to the robotic arm. The end effector comprises a plurality of vacuum ports formed from a plurality of hollow protrusions extending from a face of the end effector and connected to a vacuum chamber receiving a vacuum from a vacuum source interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
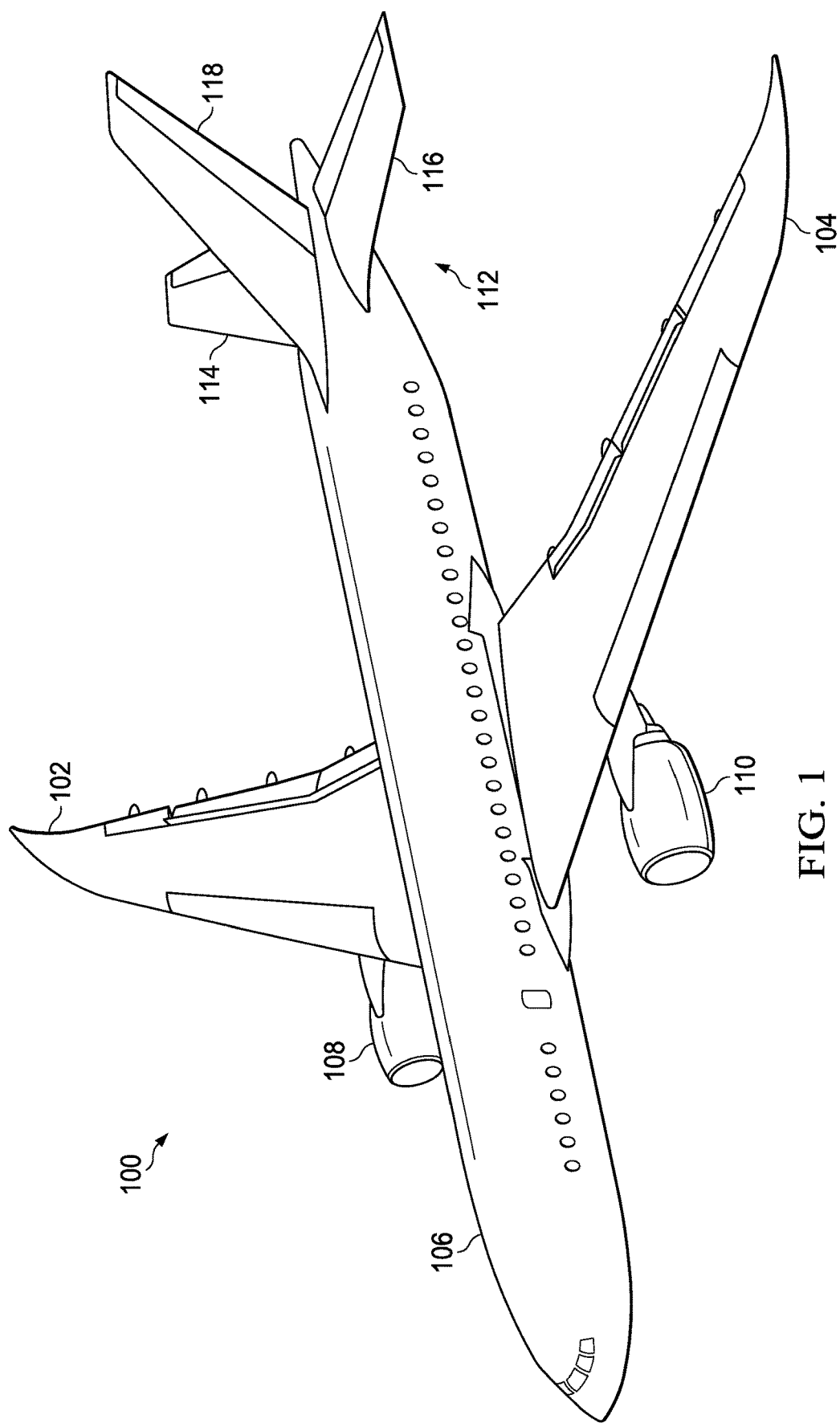
FIG. 1 is an illustration of an aircraft in which an illustrative embodiment may be implemented.

The illustrative embodiments recognize and take into account one or more different considerations. For example, the illustrative embodiments recognize and take into account that composite prepreg tape is conventionally laid down from rolls using composite placement heads. The illustrative embodiments recognize and take into account that multiple composite placement heads lay down composite prepreg tape onto a common large cure tool. The illustrative embodiments recognize and take into account that conventional composite manufacturing using composite placement heads is a time-limiting step.

The illustrative embodiments recognize and take into account that increasing the quantity of composite placement heads reduces the time of forming a component. The illustrative embodiments also recognize and take into account that the composite placement heads are considerable capital investments. The illustrative embodiments further recognize and take into account that a limited quantity of composite placement heads will be able to access a cure tool to lay down composite material. The illustrative embodiments thus recognize and take into account that the composite placement heads will remain as a time-limiting step.

The illustrative embodiments recognize and take into account that composite prepreg tape may be laid down "offline" by laying down the composite prepreg tape onto a surface other than the common large cure tool. After laying down the composite prepreg tape onto the surface, the composite prepreg tape may be moved off of the surface.

The illustrative embodiments recognize and take into account that laying down composite prepreg tape "offline" may reduce manufacturing time. The illustrative embodiments recognize and take into account that laying down the composite prepreg tape "offline" may increase manufacturing efficiency. The illustrative embodiments recognize and take into account that laying down the composite prepreg tape "offline" may reduce unproductive time for common large cure tools.

The illustrative embodiments recognize and take into account that laying down the composite prepreg tape "offline" is affected by the stickiness of the composite prepreg tape. The illustrative embodiments recognize and take into account that the composite prepreg tape will undesirably stick to conventional pick and place end effectors, complicating the process of laying down the composite prepreg tape "offline."

The illustrative embodiments recognize and take into account that a conventional approach to moving the composite prepreg tape has been to use needles to mechanically hold the composite prepreg tape. The illustrative embodiments recognize and take into account that the needles may undesirably affect the fibers in the composite material.

The illustrative embodiments recognize and take into account that moving the composite prepreg tape is different than moving composite charges. The illustrative embodiments recognize and take into account that composite charges include a plurality of layers of composite material. Thus, the illustrative embodiments recognize and take into account that the composite charges are thicker and stiffer than the composite prepreg tape. The illustrative embodiments recognize and take into account that the composite charges may be chilled for pick and place processes. The illustrative embodiments recognize and take into account that the composite charges may stay in a laydown location based on weight or other characteristics without sticking to the laydown location.

The illustrative examples recognize and take into account that picking and placing composite prepreg tape is picking and placing a thin material that is sticky on both sides. The illustrative examples recognize and take into account that at some point during a pick and place operation, the composite prepreg tape is more attached to the layup structure than it is to the end-effector. The illustrative examples recognize and take into account that it is desirable to control when the composite material is more attached to the layup structure. The illustrative examples recognize and take into account that it is desirable to have the composite material more attached to the layup structure when the composite material is in the desired location to be placed.

The illustrative embodiments recognize and take into account that an end effector desirably does not deform or tear composite prepreg tape by applying a vacuum to the composite prepreg tape. The illustrative embodiments further recognize and take into account that an end effector having a lower surface area provides the composite prepreg tape less of an opportunity to stick to the end effector. The illustrative embodiments recognize and take into account that removing the composite prepreg tape from the end effector may be performed by providing a force against the composite prepreg tape.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft manufactured using an end effector to pick and place composite materials. For example, at least one of body 106, wing 102, or wing 104 includes composite materials. The illustrative embodiments may be utilized during the manufacturing of at least one of body 106, wing 102, or wing 104 to place the composite material.

This illustration of aircraft 100 is provided for purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

In some illustrative examples, the structure may be a hardware component or a structural component of a larger platform. For example, the structure may be a beam, angle, panel, tube, bracket, or other desirable type of structure. In these illustrative examples, the larger platform may take any desirable form.

Figure 2:
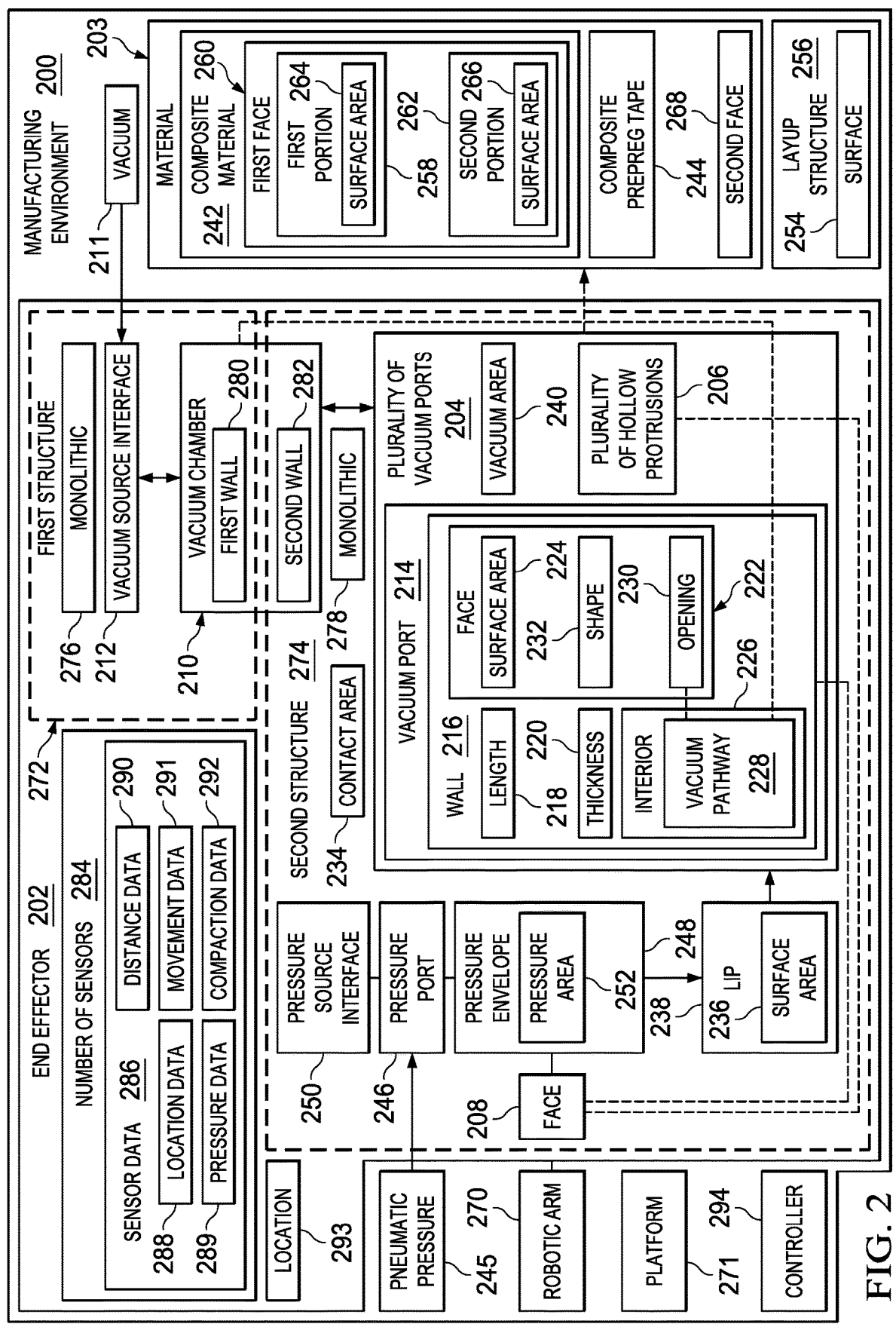
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is a depiction of an environment in which an aircraft or components of the aircraft, such as aircraft 100 of FIG. 1, may be manufactured.

End effector 202 is configured to pick and place material 203 within manufacturing environment 200. End effector 202 comprises plurality of vacuum ports 204 formed from plurality of hollow protrusions 206 extending from face 208 of end effector 202. Plurality of vacuum ports 204 is connected to vacuum chamber 210 receiving vacuum 211 from vacuum source interface 212.

Plurality of vacuum ports 204 has any desirable configuration. Plurality of vacuum ports 204 may have any desirable density, any desirable quantity, and any desirable arrangement. Further, each of plurality of vacuum ports 204 may have any desirable design. For example, each of plurality of vacuum ports 204 has any desirable length, any desirable cross-sectional shape, and any desirable wall thickness.

In some illustrative examples, each of plurality of vacuum ports 204 is the same design as each other vacuum port of plurality of vacuum ports 204. In other illustrative examples, at least one vacuum port of plurality of vacuum ports 204 has a different design than the remaining vacuum ports.

Vacuum port 214 is one of plurality of vacuum ports 204. Vacuum port 214 is formed by wall 216 extending from face 208. Wall 216 has length 218 and thickness 220. Length 218 of wall 216 is the distance from face 222 of vacuum port 214 to face 208 of end effector 202. Thickness 220 of wall 216 affects surface area 224 of face 222 of vacuum port 214.

In some illustrative examples, thickness 220 is constant along length 218 of wall 216. In some illustrative examples, thickness 220 is constant within the cross-section of wall 216. In other illustrative examples, thickness 220 of wall 216 may vary.

Interior 226 of vacuum port 214 formed by wall 216 provides vacuum pathway 228. Vacuum pathway 228 is a pathway for vacuum 211 to travel between vacuum chamber 210 and opening 230 of vacuum port 214.

Face 222 of vacuum port 214 has shape 232. Shape 232 may be any desirable shape. In some illustrative examples, shape 232 may be at least one of circular, elliptical, or some other desirable curve. In some illustrative examples, shape 232 may be the same as the shape of the remaining vacuum ports of plurality of vacuum ports 204.

Surface area 224 of face 222 of vacuum port 214 contributes to contact area 234 of end effector 202. Contact area 234 is the area of end effector 202 that contacts material 203 when material 203 is held against end effector 202. Contact area 234 includes the sum of the surface areas of the faces of each of plurality of vacuum ports 204. When material 203 contacts lip 238, contact area 234 also includes surface area 236 of lip 238 surrounding plurality of vacuum ports 204.

Opening 230 of face 222 of vacuum port 214 contributes to vacuum area 240. Vacuum area 240 includes the sum of the vacuum areas of the faces of each of plurality of vacuum ports 204. Vacuum area 240 is the total surface area for vacuum 211 applied.

End effector 202 is configured to hold material 203 against end effector 202 using vacuum 211 supplied through plurality of vacuum ports 204. Vacuum 211 will hold material 203 across vacuum area 240 such that material 203 contacts end effector 202 on contact area 234.

End effector 202 is configured to pick and place material 203 that is pliable and sticky without material 203 undesirably adhering to end effector 202. End effector 202 is configured to pick and place material 203 without generating inconsistencies in material 203. End effector 202 is configured to pick and place material 203 with desirable removal of material 203.

Material 203 may be any desirable type of material. Material 203 may be any type of material that may be lifted using vacuum 211 without undesirably affecting material 203. Material 203 may be any type of material that may be lifted using vacuum 211 without undesirably affecting end effector 202.

In some illustrative examples, material 203 is composite material 242. In these illustrative examples, material 203 may take the form of any desirable type of composite material 242. In some examples, composite material 242 is a tacky pre-impregnated composite material. In some further illustrative examples, material 203 is composite prepreg tape 244.

Pneumatic pressure 245 is applied to release composite material 242 from end effector 202. Pressure port 246 is configured to supply pneumatic pressure 245 between plurality of vacuum ports 204 when composite material 242 is contacting plurality of vacuum ports 204. Pressure port 246 supplies pneumatic pressure 245 to pressure envelope 248. Pressure envelope 248 comprises face 208 and lip 238 surrounding plurality of vacuum ports 204.

Pressure port 246 may provide pneumatic pressure 245 at any desirable location in pressure envelope 248. In some illustrative examples, pressure port 246 comprises a hole flush with face 208. In these illustrative examples, pressure port 246 may further comprise a tube extending through vacuum chamber 210.

When pressure port 246 comprises a hole flush with face 208, pressure source interface 250 may extend out of vacuum chamber 210. When pressure port 246 comprises a hole flush with face 208, pressure source interface 250 may be connected to vacuum chamber 210.

In some illustrative examples, pressure port 246 comprises a hole flush with lip 238. In these illustrative examples, pressure source interface 250 may be connected to lip 238.

Pneumatic pressure 245 supplied by pressure port 246 is sufficient to remove composite material 242 from plurality of vacuum ports 204 after stopping vacuum 211. In some illustrative examples, pneumatic pressure 245 is sufficient to prevent or remove air from between composite material 242 and surface 254 of layup structure 256. In some illustrative examples, pneumatic pressure 245 supplied by pressure port 246 is sufficient to compact composite material 242 onto surface 254 of layup structure 256.

It is desirable to prevent or remove air from between composite material 242 and surface 254 of layup structure 256. Applying pneumatic pressure 245 to small portions of composite material 242 may result in inconsistencies.

Pressure area 252 of pressure envelope 248 is configured to provide sufficient coverage to remove composite material 242 from end effector 202. In some illustrative examples, pressure area 252 of pressure envelope 248 is configured to provide sufficient coverage to compact composite material 242.

In some illustrative examples, pressure area 252 of pressure envelope 248 is greater than vacuum area 240 of plurality of vacuum ports 204. In some illustrative examples, pressure area 252 of pressure envelope 248 is greater than contact area 234 of end effector 202.

At least one of a quantity, a shape, or a size of plurality of vacuum ports 204 is selected to set at least one of a desired contact area 234, a desired vacuum area 240, or a desired pressure area 252. Changing at least one of a quantity, a shape, or a size will increase or decrease at least one of contact area 234, vacuum area 240, or pressure area 252.

In these illustrative examples, first portion 258 of first face 260 of composite material 242 is held against plurality of vacuum ports 204 of end effector 202 using vacuum 211 supplied to end effector 202 through vacuum source interface 212. Plurality of vacuum ports 204 is formed of plurality of hollow protrusions 206. Plurality of hollow protrusions 206 extends sufficiently away from face 208 such that composite material 242 does not contact face 208 when composite material 242 is held against plurality of hollow protrusions 206.

Pneumatic pressure 245 is applied to first face 260 of composite material 242 to remove composite material 242 from plurality of vacuum ports 204. In some illustrative examples, pneumatic pressure 245 is supplied from pressure port 246 of end effector 202 to second portion 262 of first face 260 of composite material 242.

In these illustrative examples, surface area 264 of first portion 258 is smaller than surface area 266 of second portion 262. Pneumatic pressure 245 is supplied from pressure port 246 of end effector 202 so that second face 268 of composite material 242 contacts surface 254 of layup structure 256.

End effector 202 is connected to robotic arm 270. Movement of robotic arm 270 moves end effector 202. Robotic arm 270 moves end effector 202 to a location to pick up composite material 242. In some illustrative examples, composite material 242 is lifted from platform 271 by end effector 202 connected to robotic arm 270. In these illustrative examples, robotic arm 270 positions end effector 202 such that plurality of hollow protrusions 206 contact composite material 242 while composite material 242 rests on platform 271.

When end effector 202 is contacting composite material 242, vacuum 211 is supplied through plurality of vacuum ports 204. Vacuum 211 holds composite material 242 against plurality of vacuum ports 204 of end effector 202. While vacuum 211 holds composite material 242 against plurality of vacuum ports 204, robotic arm 270 moves end effector 202 to position composite material 242 over surface 254 of layup structure 256. Pneumatic pressure 245 is applied to composite material 242 to lay up composite material 242 on layup structure 256.

End effector 202 allows for at least one of vacuum 211 or pneumatic pressure 245 as desired. Contact area 234 in contact with composite prepreg tape 244, or other type of material 203, is minimized so composite prepreg tape 244 has less of an opportunity to stick to end effector 202.

In some illustrative examples, end effector 202 is formed of first structure 272 and second structure 274. In some illustrative examples, first structure 272 is monolithic 276. In some illustrative examples, second structure 274 is monolithic 278.

In one illustrative example, vacuum source interface 212 is a portion of first structure 272. When first structure 272 is monolithic 276, vacuum source interface is a portion of monolithic 276 first structure 272. In this illustrative example, monolithic 276 first structure 272 forms first wall 280 of vacuum chamber 210.

In some illustrative examples, plurality of hollow protrusions is portions of monolithic 278 second structure 274. As depicted, monolithic 278 second structure 274 forms second wall 282 of vacuum chamber opposite of first wall 280. In the depicted illustrative example, monolithic 278 second structure 274 is configured to form pressure envelope 248 with composite material 242 when composite material 242 is held against plurality of hollow protrusions 206.

In some illustrative examples, end effector 202 performs automated composite placement as part of an automated composite lamination system. When end effector 202 performs an automated process, control feedback is used to generate commands for end effector 202.

In some illustrative examples, end effector 202 has number of sensors 284. As used herein, "a number of" items is one or more items. A number of sensors, such as number of sensors 284, includes one or more sensors. Number of sensors 284 includes any desirable quantity of sensors. Number of sensors 284 generates any desirable type of measurements as sensor data 286. Although number of sensors 284 is depicted as part of end effector 202, in some illustrative examples, number of sensors 284 may be at least one of connected to robotic arm 270, connected to end effector 202, or positioned within manufacturing environment 200.

Number of sensors 284 may be placed throughout manufacturing environment 200 to track the movement of end effector 202. In another illustrative example, number of sensors 284 may be placed throughout manufacturing environment 200 to generate location data 288 for at least one of composite material 242, layup structure 256, or end effector 202.

In some illustrative examples, number of sensors 284 may be connected to robotic arm 270 rather than end effector 202. In some illustrative examples, number of sensors 284 may be connected to robotic arm 270, in addition to end effector 202.

In some illustrative examples, number of sensors 284 is configured to generate at least one of location data 288, pressure data 289, distance data 290, movement data 291, or compaction data 292. In these illustrative examples, sensor data 286 generated by number of sensors 284 includes at least one of location data 288, pressure data 289, distance data 290, movement data 291, or compaction data 292.

For example, number of sensors 284 may generate location data 288 for location 293 of end effector 202 with manufacturing environment 200. End effector 202 travels within manufacturing environment 200 to pick up material 203 and place material 203 onto layup structure 256. Tracking location 293 of end effector 202 within manufacturing environment 200 is desirable for the precision lifting and placement of material 203.

In another illustrative example, number of sensors 284 may generate pressure data 289 for at least one of pneumatic pressure 245 applied to composite material 242, vacuum 211 applied to composite material 242, or a mechanical pressure applied to composite material 242 by end effector 202.

In yet another illustrative example, number of sensors 284 may generate distance data 290 of end effector 202 from at least one of composite material 242 or layup structure 256. For example, number of sensors 284 generates distance data 290 of end effector 202 from composite material 242 as end effector 202 is lowered towards composite material 242 to pick up composite material 242. In another example, number of sensors 284 generates distance data 290 of end effector 202 from composite material 242 as composite material 242 is placed onto layup structure 256. In one example, number of sensors 284 generates distance data 290 of end effector 202 from composite material 242 as end effector 202 moves away from composite material 242 and layup structure 256.

In a further illustrative example, number of sensors 284 generates movement data 291 describing movement of robotic arm 270 within manufacturing environment 200. Tracking location 293 of end effector 202 within manufacturing environment 200 is desirable for the precision lifting and placement of material 203. Movement data 291 may be a primary or secondary method of locating end effector 202 or a portion of end effector 202 within manufacturing environment 200.

In yet another illustrative example, number of sensors 284 may generate compaction data for the compaction of composite material 242 against layup structure 256. In some illustrative examples, compaction data 292 includes at least one of an amount of pneumatic pressure 245 applied to composite material 242, a distance of end effector 202 from layup structure 256 while compacting composite material 242 on layup structure 256, an order of application of pneumatic pressure 245 when multiple pressure envelopes (not depicted) are present, or an image of composite material 242 after compacting composite material 242.

Controller 294 controls at least one of movement of end effector 202, vacuum 211 supplied to end effector 202, or pneumatic pressure 245 supplied to end effector 202 based on sensor data 286. Controller 294 may be implemented in at least one of hardware or software. In some illustrative examples, controller 294 may be a processor unit in a computer system. In some illustrative examples, controller 294 may be implemented as a circuit.

The illustration of manufacturing environment 200 in FIG. 2 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

In an example, plurality of vacuum ports 204 may not be components of second structure 274. In some illustrative examples, plurality of vacuum ports 204 may be individual vacuum ports arranged in an array and each is secured to face 208. In some illustrative examples, plurality of vacuum ports 204 may be a portion of a separate structure. The separate structure may be secured to second structure 274.

In yet another example, more than one pressure port is pneumatically connected to pressure envelope 248. For example, two or more pressure ports may supply pneumatic pressure 245 to pressure envelope 248.

In other examples, pressure port 246 may not be present. In these examples, pneumatic pressure 245 may be supplied through plurality of vacuum ports 204. When pneumatic pressure 245 is supplied to plurality of vacuum ports 204, other components, such as lip 238 or pressure envelope 248, may or may not be present.

In some illustrative examples, when pneumatic pressure 245 is supplied through plurality of vacuum ports 204, pressure port 246 may include an optional check valve. In these illustrative examples, pressure source interface 250 would supply pneumatic pressure 245 to vacuum chamber 210. The optional check valve (not depicted) would be configured to seal when vacuum 211 is applied to vacuum chamber 210. When the optional check valve seals, vacuum 211 is only present at plurality of vacuum ports 204. In these illustrative examples, when pneumatic pressure 245 is applied to vacuum chamber 210, the optional check valve would open and pneumatic pressure 245 would be delivered through plurality of vacuum ports 204 and pressure port 246. One non-limiting example of a physical implementation of end effector 202 having an optional check valve can be seen as end effector 1100 in FIGS. 11 and 12.

When pneumatic pressure 245 is supplied through plurality of vacuum ports 204, vacuum area 240 is large enough to provide a sufficient amount of pneumatic pressure 245 to remove composite material 242 from plurality of hollow protrusions 206. When pneumatic pressure 245 is supplied through plurality of vacuum ports 204, vacuum area 240 is large enough to provide sufficient compaction to composite material 242.

As another example, more than one vacuum chamber may be present in end effector 202. In this example, each vacuum chamber is connected to a respective plurality of hollow protrusions. For example, when two vacuum chambers are present, the first vacuum chamber is connected to a first plurality of hollow protrusions and the second vacuum chamber is connected to a second plurality of hollow protrusions. Each respective plurality of hollow protrusions is independently controlled by supplying or stopping vacuum 211 to each respective vacuum chamber.

In a specific example, a plurality of vacuum chambers may be used to "sweep" composite material 242 down onto layup structure 256. Sweeping of composite material 242 may reduce the occurrence of air or other inconsistencies in the compaction of composite material 242. In this specific example, the plurality of vacuum chambers may be removed from the vacuum in sequence. Additionally, pneumatic pressure will be applied to at least one of the vacuum chambers or the associated pressure envelopes in sequence. When more than one vacuum chamber is present, a respective vacuum source interface is present for each vacuum chamber. When more than one vacuum chamber is present in end effector 202, a respective pressure source interface may be present for each vacuum chamber. By removing the vacuum and applying pneumatic pressure in sequence, a pneumatic sweep of composite material 242 may be accomplished.

In one example, pneumatic pressure may be applied to composite material held on all pluralities of hollow protrusions simultaneously using one pressure port. For example, one pressure envelope may be associated with vacuum ports for multiple vacuum chambers.

In other examples, pneumatic pressure may be applied independently between each respective plurality of hollow protrusions. For example, each vacuum chamber may be associated with a respective pressure envelope and a respective pressure port. In these examples, pneumatic pressure may be applied between the first plurality of hollow protrusions using a first pressure envelope. Pneumatic pressure may be applied between the second plurality of hollow protrusions using a second pressure envelope independent of the pneumatic pressure applied by the first pressure envelope.

In some illustrative examples, separate pressure envelopes may be used to hold multiple separate pieces of material. The multiple pieces may be formed of the same type of material or different types of material. In these illustrative examples, each pressure envelope may be associated with a separate vacuum chamber or with a same vacuum chamber. In one example, each pressure envelope may hold a different piece of material. The multiple pieces of material may be held by a vacuum from a single vacuum chamber or multiple vacuum chambers.

In some illustrative examples, separate pressure envelopes may be used to "sweep down" a single piece of material 203 held by a single vacuum chamber, vacuum chamber 210. The vacuum will be released on the single piece of material 203 prior to sweeping material 203. After releasing the vacuum on material 203, a pneumatic pressure is applied by the plurality of pressure envelopes in sequence, accomplishing a pneumatic sweep of material 203. One non-limiting example of a physical implementation of end effector 202 having a single vacuum chamber and multiple pressure envelopes can be seen as end effector 900 in FIGS. 9 and 10.

Figure 3:
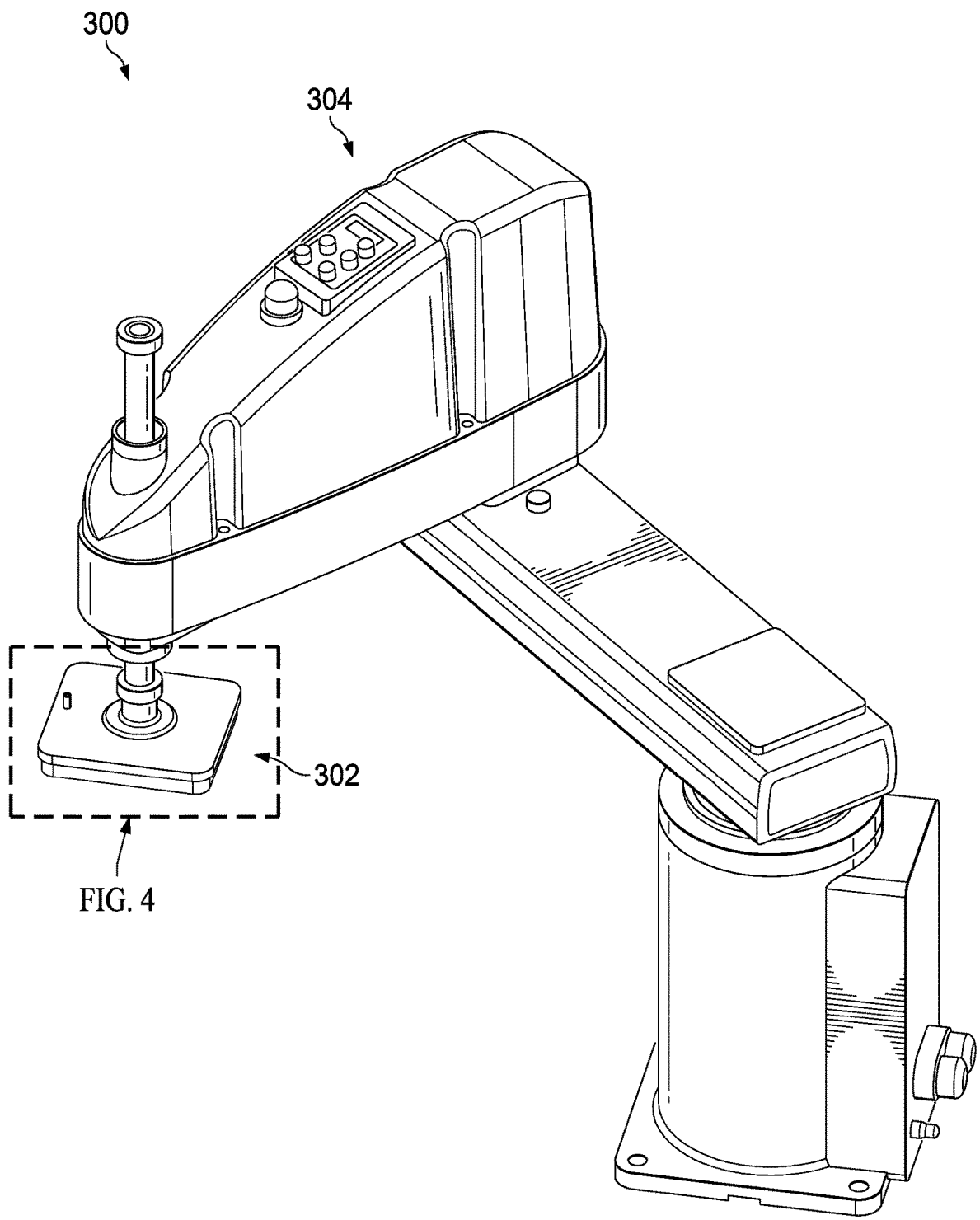
FIG. 3 is an illustration of an isometric view of a robotic arm and an end effector in accordance with an illustrative embodiment.

Turning now to FIG. 3, an illustration of an isometric view of a robotic arm and an end effector is depicted in accordance with an illustrative embodiment. In view 300, end effector 302 is connected to robotic arm 304. End effector 302 is a physical implementation of end effector 202 of FIG. 2. End effector 302 is configured to move a composite material (not depicted), such as composite prepreg tape 244 of FIG. 2.

Although not depicted in FIG. 3, any desirable quantity or type of sensors may be connected to end effector 302 or robotic arm 304 for process control. For example, at least one of end effector 302 or robotic arm 304 may be controlled based on a number of sensors (not depicted) connected to at least one of end effector 302 or robotic arm 304. Measurements from a number of sensors (not depicted) may be used to determine when to move robotic arm 304, when to pull the vacuum on end effector 302, when to apply pressure to end effector 302, when end effector 302 is holding a composite material (not depicted), or when the composite material has been removed from end effector 302 and compacted onto a layup structure (not depicted).

Figure 4:
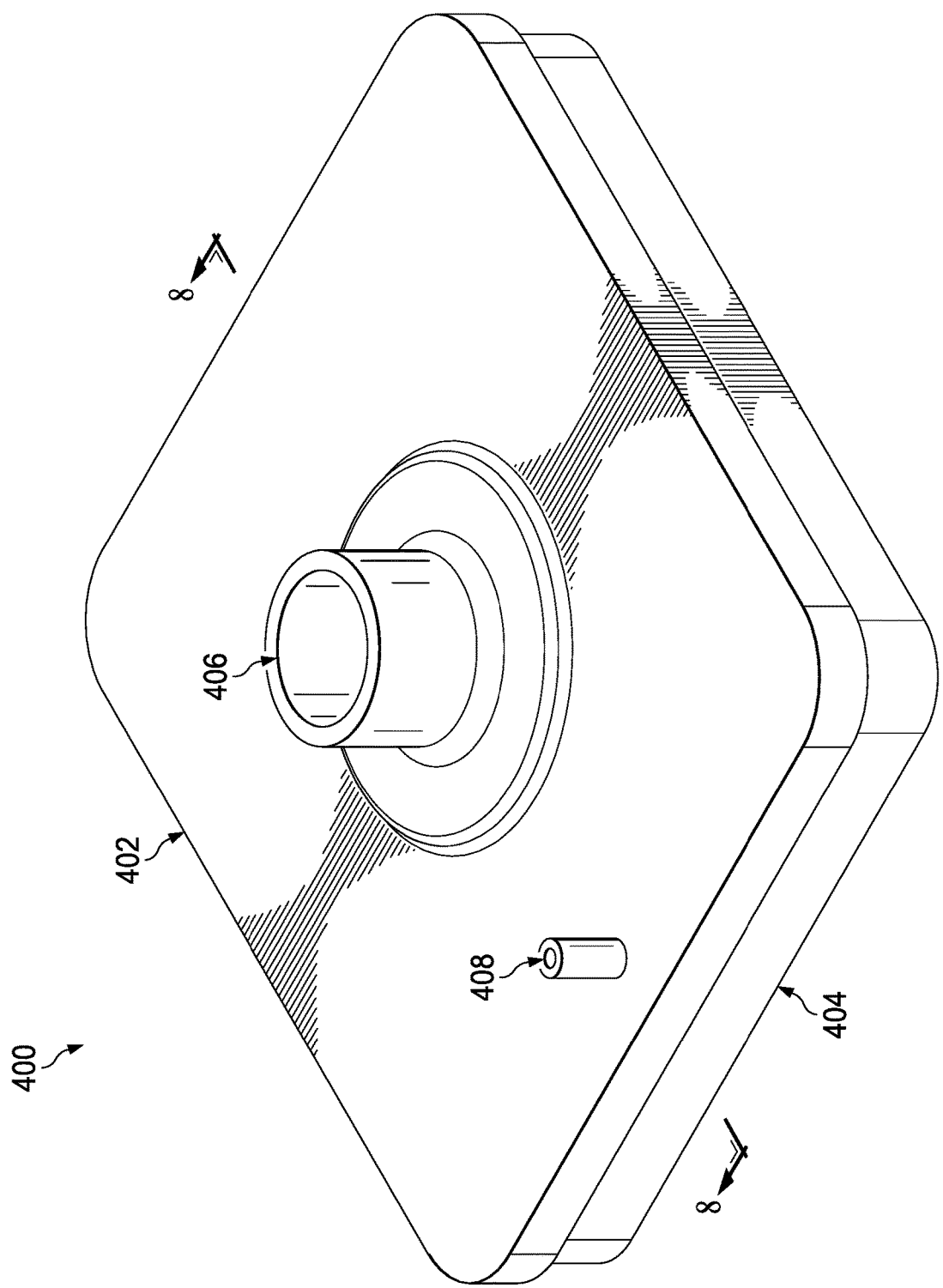
FIG. 4 is an illustration of a top isometric view of an end effector in accordance with an illustrative embodiment.

Turning now to FIG. 4, an illustration of a top isometric view of an end effector is depicted in accordance with an illustrative embodiment. End effector 400 is a physical implementation of end effector 202 of FIG. 2. End effector 400 is configured to move a composite material (not depicted), such as composite prepreg tape 244 of FIG. 2. End effector 400 is one implementation of end effector 302 of FIG. 3.

As depicted, end effector 400 has first monolithic structure 402 and second monolithic structure 404. Vacuum source interface 406 connects end effector 400 to a robotic arm (not depicted) such as robotic arm 270 of FIG. 2 or robotic arm 304 of FIG. 3. Vacuum source interface 406 provides a vacuum to hold a composite material (not depicted) against end effector 400.

As depicted, pressure source interface 408 extends through first monolithic structure 402. Pressure source interface 408 provides pneumatic pressure to remove the composite material (not depicted) from end effector 400.

Figure 5:
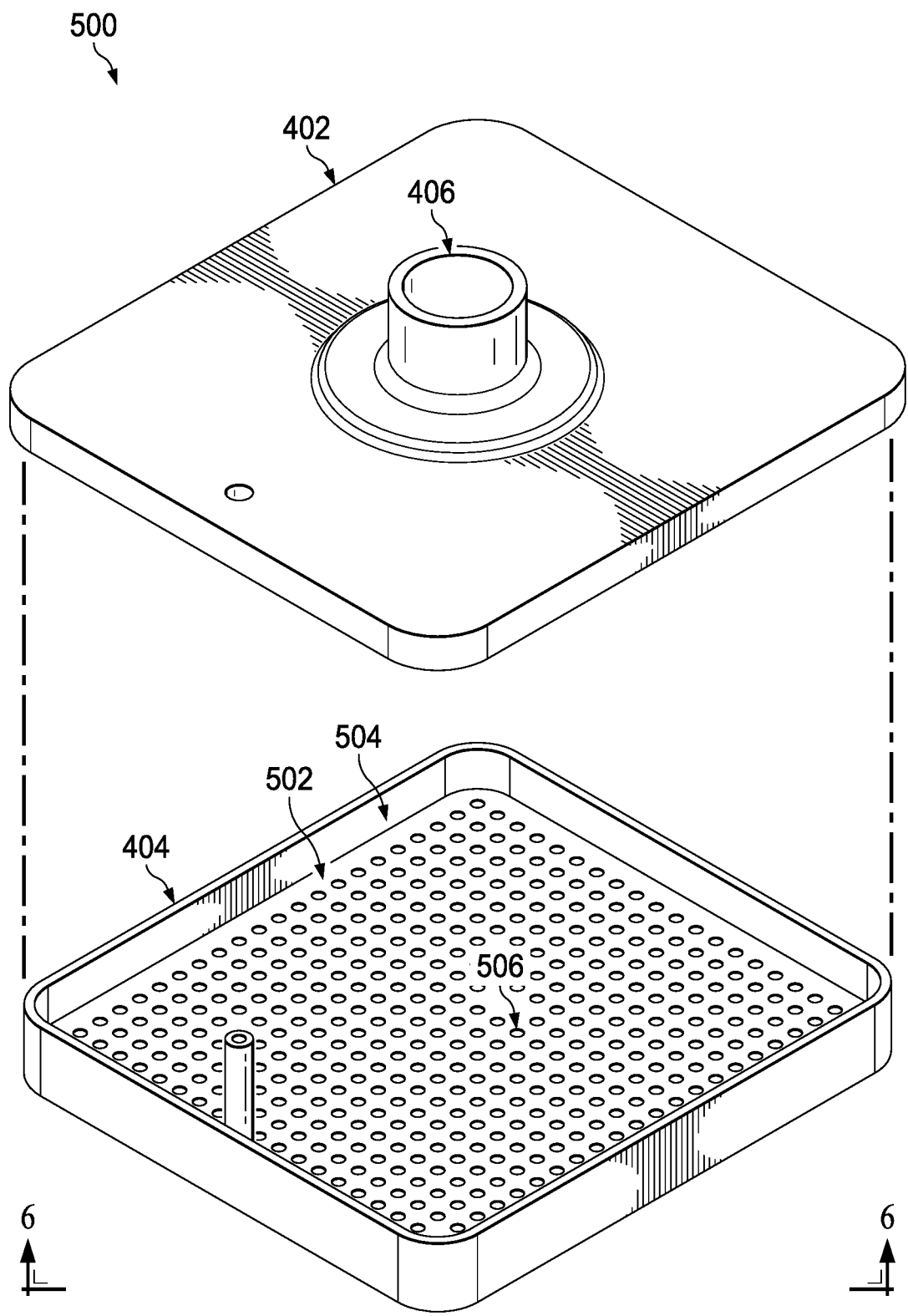
FIG. 5 is an illustration of a top exploded view of an end effector in accordance with an illustrative embodiment.

Turning now to FIG. 5, an illustration of a top exploded view of an end effector is depicted in accordance with an illustrative embodiment. View 500 is a top exploded view of end effector 400. In view 500, second wall 502 of vacuum chamber 504 is visible. Plurality of holes 506 extend through second wall 502 of vacuum chamber 504. Plurality of holes 506 in second wall 502 connects vacuum chamber 504 to a plurality of vacuum ports (not depicted).

Figure 6:
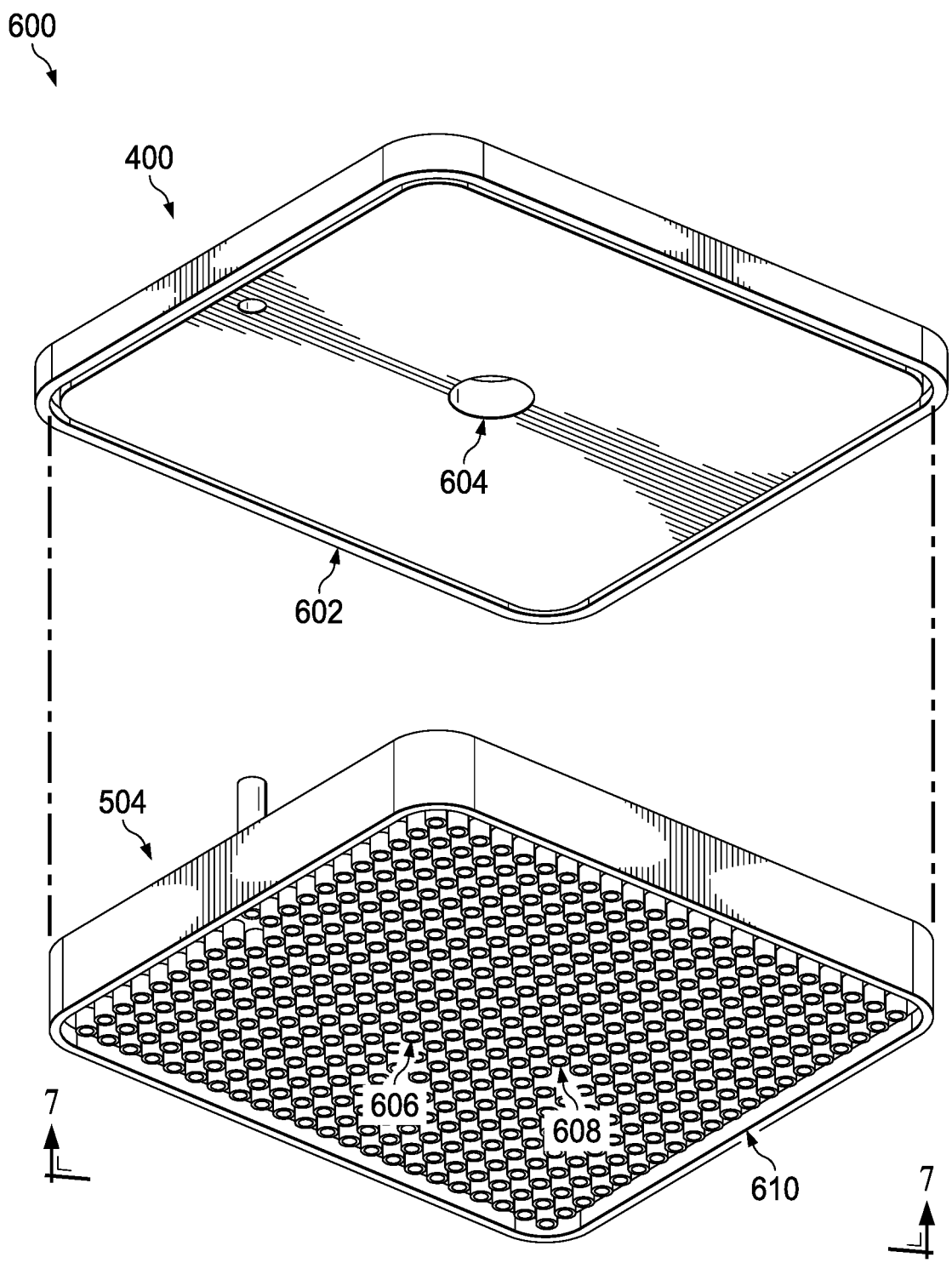
FIG. 6 is an illustration of a bottom exploded view of an end effector in accordance with an illustrative embodiment.

Turning now to FIG. 6, an illustration of a bottom exploded view of an end effector is depicted in accordance with an illustrative embodiment. View 600 is a bottom exploded view of end effector 400. In view 600, first wall 602 of vacuum chamber 504 is visible. As depicted, a vacuum is supplied from vacuum source interface 406 through hole 604 into vacuum chamber 504.

In view 600, plurality of vacuum ports 606 is visible. Plurality of vacuum ports 606 is formed by plurality of hollow protrusions 608. During operation, vacuum is supplied from vacuum chamber 504 to plurality of hollow protrusions 608. During operation, a composite material (not depicted) is held against end effector 400 by the vacuum through plurality of hollow protrusions 608.

In some illustrative examples, the composite material contacts plurality of hollow protrusions 608 and lip 610 during operation. In some illustrative examples, the composite material only contacts a subset of plurality of hollow protrusions 608. In some illustrative examples when the composite material contacts a subset of plurality of hollow protrusions 608, the composite material contacts only a portion of lip 610. In other illustrative examples, the composite material only contacts plurality of hollow protrusions 608 and not lip 610.

Figure 7:
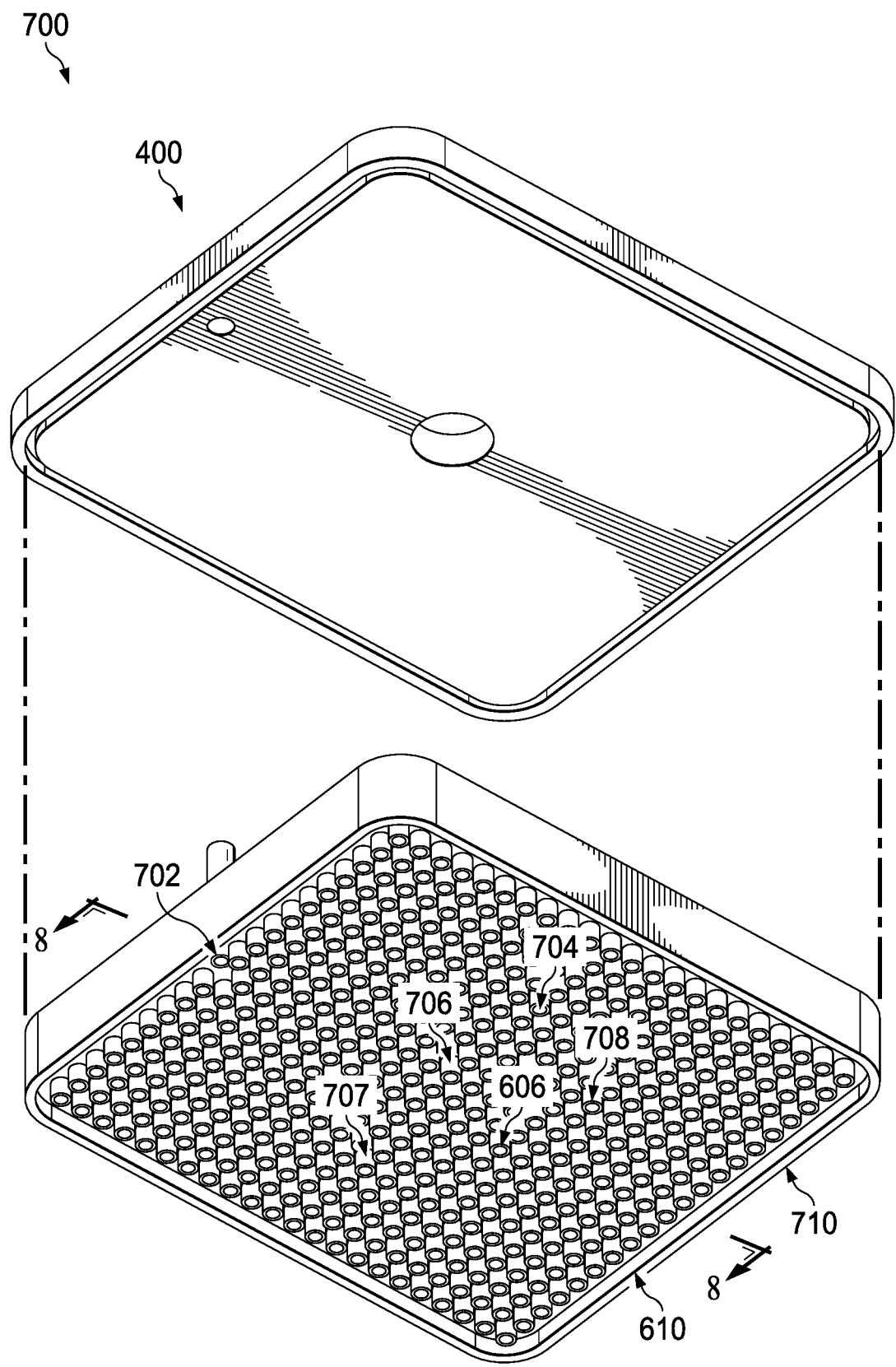
FIG. 7 is an illustration of a bottom isometric view of a monolithic second structure in accordance with an illustrative embodiment.

Turning now to FIG. 7, an illustration of a bottom isometric view of a monolithic second structure is depicted in accordance with an illustrative embodiment. View 700 is a bottom isometric view of end effector 400. In view 700, pressure port 702 is visible. Pressure port 702 supplies pneumatic pressure to pressure envelope 704 comprising face 706 and lip 610 surrounding plurality of vacuum ports 606.

As can be seen in view 700, pressure area 707 of pressure envelope 704 is greater than vacuum area 708 of plurality of vacuum ports 606. In end effector 400, pressure area 707 is more than three times greater than vacuum area 708.

As can be seen in view 700, pressure area 707 of pressure envelope 704 is greater than contact area 710 of end effector 400. In this illustrative example, contact area 710 includes the surface areas of plurality of vacuum ports 606 and the surface area of lip 610. In end effector 400, pressure area 707 of pressure envelope 704 is about twice the area of contact area 710.

Figure 8:
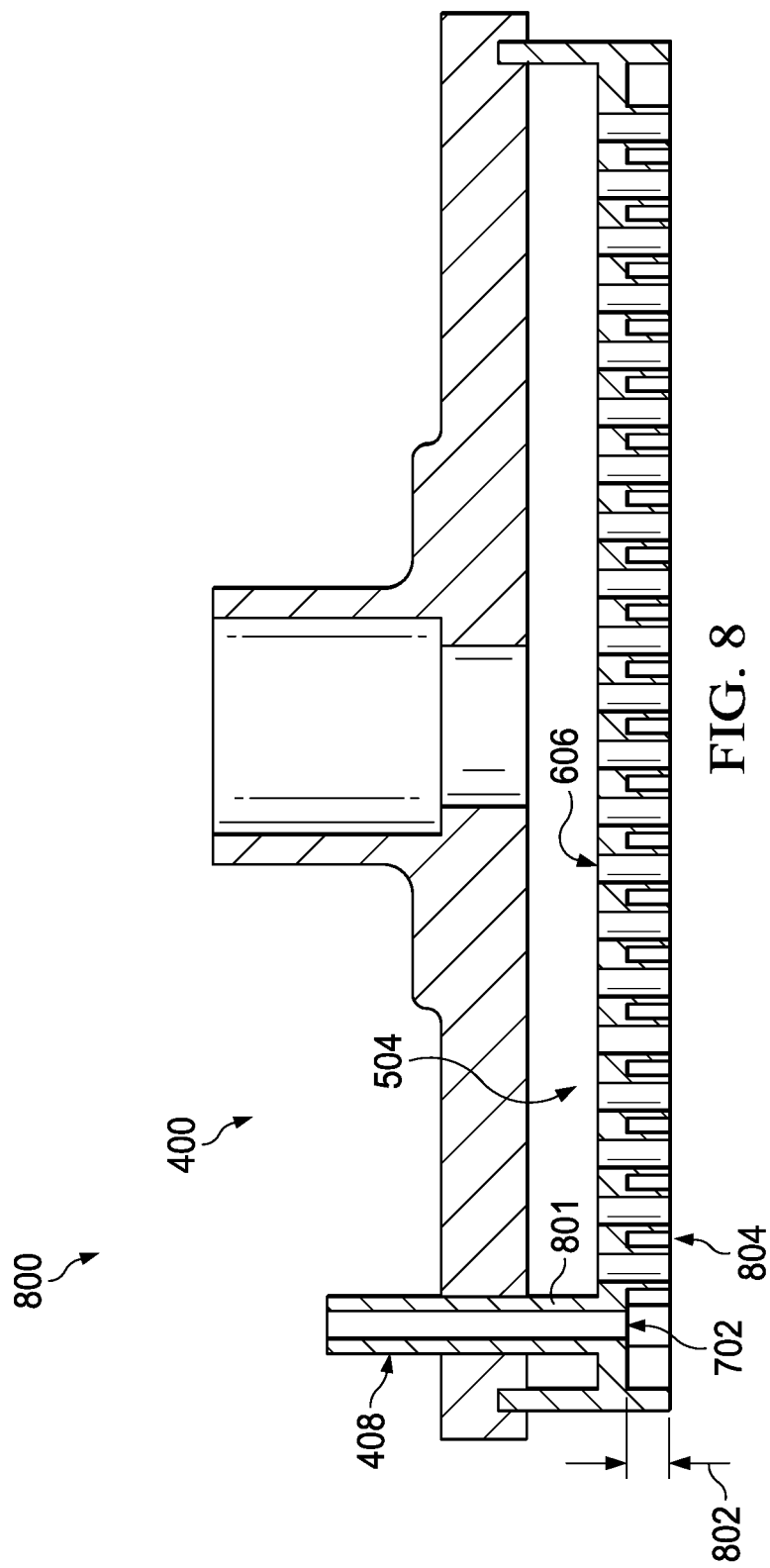
FIG. 8 is an illustration of a cross-sectional view of an end effector in accordance with an illustrative embodiment.

Turning now to FIG. 8, an illustration of a cross-sectional view of an end effector is depicted in accordance with an illustrative embodiment. View 800 is a cross-sectional view of end effector 400. As depicted, vacuum chamber 504 supplies a vacuum to plurality of vacuum ports 606. As depicted, pressure port 702 is formed by tube 801 extending through vacuum chamber 504. Plurality of vacuum ports 606 extends distance 802 from face 804 of end effector 400. Plurality of vacuum ports 606 extends sufficiently away from face 804 such that a composite material (not depicted) does not contact face 804 when the composite material is held on plurality of vacuum ports 606.

Figure 9:
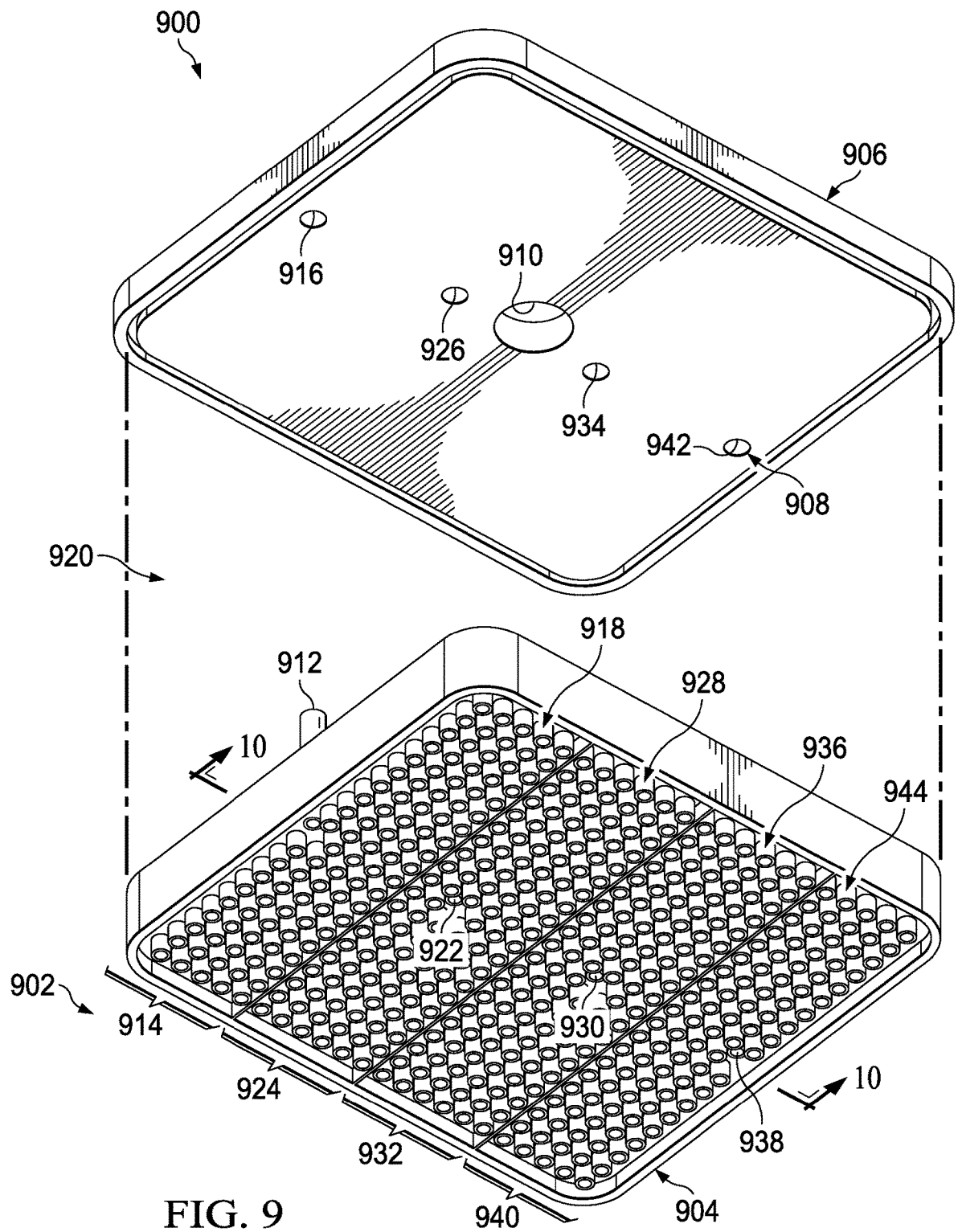
FIG. 9 is an illustration of a bottom exploded view of an end effector in accordance with an illustrative embodiment.

Turning now to FIG. 9, an illustration of a bottom exploded view of an end effector is depicted in accordance with an illustrative embodiment. End effector 900 is a physical implementation of end effector 202 of FIG. 2. A material, such as material 203 of FIG. 2, may be "swept down" (not depicted) onto a layup structure, such as layup structure 256 of FIG. 2, using end effector 900. End effector 900 has plurality of pressure envelopes 902 in second structure 904.

First structure 906 has plurality of holes 908 and vacuum source interface 910. Each of plurality of holes 908 is configured to receive a pressure source interface associated with a respective pressure envelope of plurality of pressure envelopes 902.

Pressure source interface 912 provides pressure to pressure envelope 914 of plurality of pressure envelopes 902. When assembled, pressure source interface 912 extends through hole 916 of plurality of holes 908 in first structure 906. Plurality of vacuum ports 918 is present in pressure envelope 914. Plurality of vacuum ports 918 receives vacuum from vacuum chamber 920 connected to vacuum source interface 910.

Pressure source interface 922 provides pressure to pressure envelope 924 of plurality of pressure envelopes 902. When assembled, pressure source interface 922 extends through hole 926 of plurality of holes 908 in first structure 906. Plurality of vacuum ports 928 is present in pressure envelope 924. Plurality of vacuum ports 928 receives vacuum from vacuum chamber 920 connected to vacuum source interface 910.

Pressure source interface 930 provides pressure to pressure envelope 932 of plurality of pressure envelopes 902. When assembled, pressure source interface 930 extends through hole 934 of plurality of holes 908 in first structure 906. Plurality of vacuum ports 936 is present in pressure envelope 932. Plurality of vacuum ports 936 receives vacuum from vacuum chamber 920 connected to vacuum source interface 910.

Pressure source interface 938 provides pressure to pressure envelope 940 of plurality of pressure envelopes 902. When assembled, pressure source interface 938 extends through hole 942 of plurality of holes 908 in first structure 906. Plurality of vacuum ports 944 is present in pressure envelope 940. Plurality of vacuum ports 944 receives vacuum from vacuum chamber 920 connected to vacuum source interface 910.

A material may be swept down by first releasing the vacuum from vacuum chamber 920 and then sequentially applying pressure to plurality of pressure envelopes 902. For example, after releasing the vacuum from vacuum chamber 920, pressure may be applied to pressure envelope 914, pressure envelope 924, pressure envelope 932, and pressure envelope 940 in sequence.

In the illustrative examples, each of plurality of vacuum ports 918, plurality of vacuum ports 928, plurality of vacuum ports 936, and plurality of vacuum ports 944 may have any desirable quantity of vacuum ports. As depicted, the combination of plurality of vacuum ports 918, plurality of vacuum ports 928, plurality of vacuum ports 936, and plurality of vacuum ports 944 has fewer vacuum ports than plurality of vacuum ports 606 of FIG. 6. As depicted, each of plurality of vacuum ports 918, plurality of vacuum ports 928, plurality of vacuum ports 936, and plurality of vacuum ports 944 has the same quantity of vacuum ports. In some alternative illustrative examples, at least one of plurality of vacuum ports 918, plurality of vacuum ports 928, plurality of vacuum ports 936, and plurality of vacuum ports 944 may have desirable different quantity of vacuum ports than any of the remaining of each of plurality of vacuum ports 918, plurality of vacuum ports 928, plurality of vacuum ports 936, and plurality of vacuum ports 944.

Figure 10:
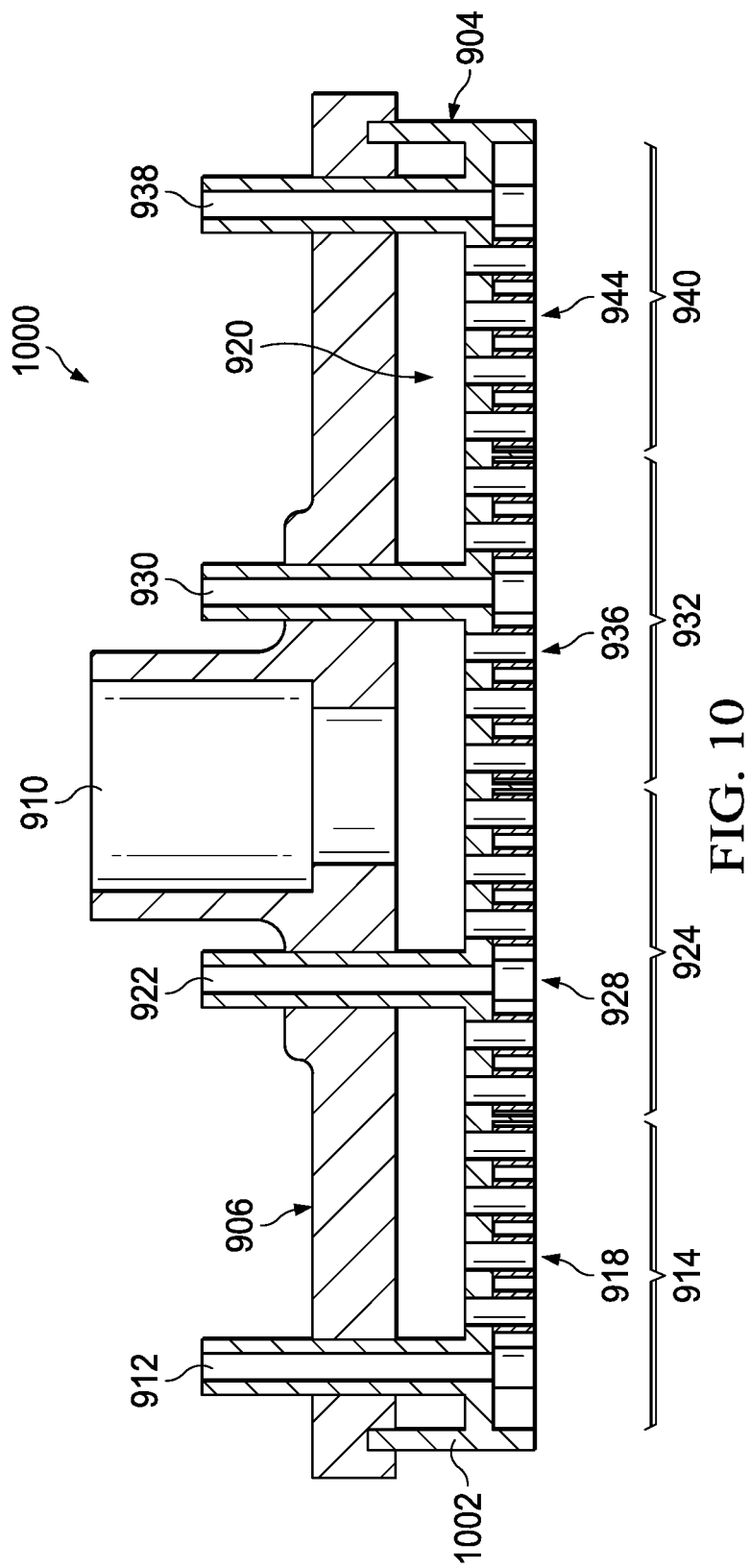
FIG. 10 is an illustration of a cross-sectional view of an end effector in accordance with an illustrative embodiment.

Turning now to FIG. 10, an illustration of a cross-sectional view of an end effector is depicted in accordance with an illustrative embodiment. View 1000 is a cross-sectional view of end effector 900. As depicted, end effector 900 comprises one vacuum chamber, vacuum chamber 920, and four pressure envelopes, pressure envelope 914, pressure envelope 924, pressure envelope 932, and pressure envelope 940.

Vacuum chamber 920 provides a vacuum to each of plurality of vacuum ports 918, plurality of vacuum ports 928, plurality of vacuum ports 936, and plurality of vacuum ports 944. As depicted, plurality of vacuum ports 918, plurality of vacuum ports 928, plurality of vacuum ports 936, and plurality of vacuum ports 944 are an array. The array is secured to second structure 904.

As depicted, each of pressure source interface 912, pressure source interface 922, pressure source interface 930, and pressure source interface 938 extends through first structure 906. In some alternative illustrative examples, at least one of pressure source interface 912, pressure source interface 922, pressure source interface 930, and pressure source interface 938 may instead extend through lip 1002 of second structure 904.

Figure 11:
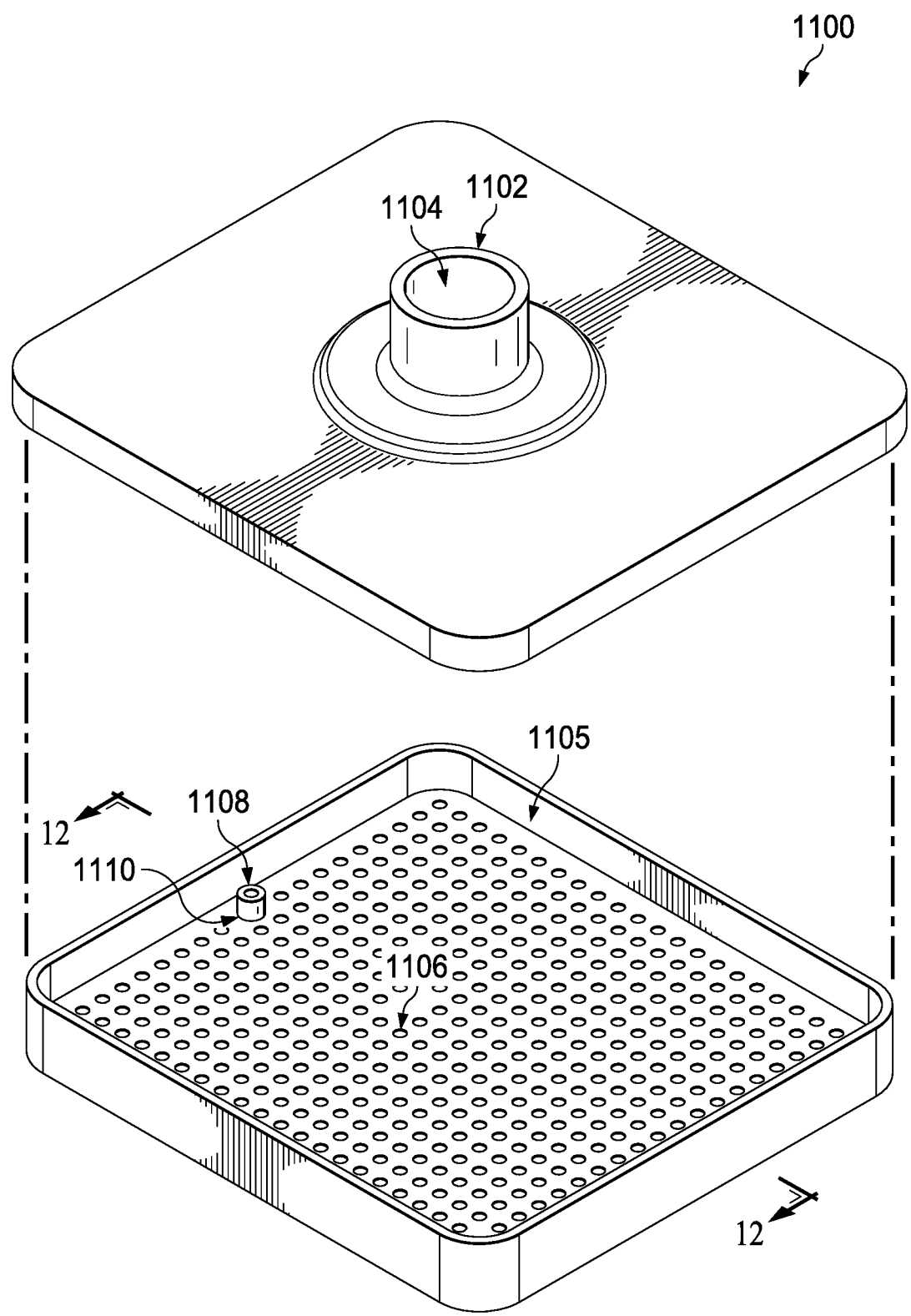
FIG. 11 is an illustration of a top exploded view of an end effector in accordance with an illustrative embodiment.

Turning now to FIG. 11, an illustration of a top exploded view of an end effector is depicted in accordance with an illustrative embodiment. End effector 1100 is a physical implementation of end effector 202 of FIG. 2. In end effector 1100, pressure source interface 1102 and vacuum source interface 1104 are a common interface.

Pressure source interface 1102 delivers pneumatic pressure to vacuum chamber 1105 in end effector 1100. Vacuum source interface 1104 delivers a vacuum to vacuum chamber 1105 in end effector 1100. Pneumatic pressure is provided to vacuum chamber 1105 only after releasing the vacuum in vacuum chamber 1105.

The vacuum will be delivered from vacuum chamber 1105 through plurality of holes 1106. The vacuum will close check valve 1108 such that the vacuum does go through pressure valve 1110. Check valve 1108 is a portion of pressure valve 1110. Check valve 1108 only allows pneumatic pressure through pressure valve 1110.

Figure 12:
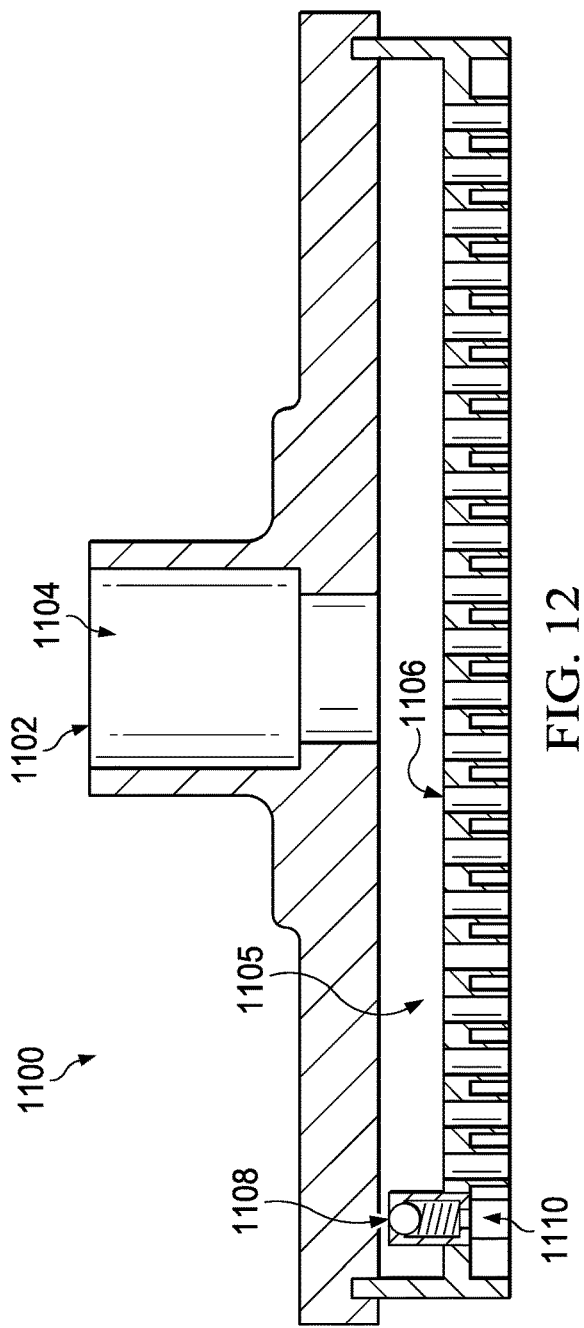
FIG. 12 is an illustration of a cross-sectional view of an end effector in accordance with an illustrative embodiment.

Turning now to FIG. 12, an illustration of a cross-sectional view of an end effector is depicted in accordance with an illustrative embodiment. View 1200 is a cross-sectional view of end effector 1100. As a result of check valve 1108, pressure envelope 1202 receives only pneumatic pressure from pressure valve 1110. Plurality of vacuum ports 1204 receive either pneumatic pressure or vacuum from vacuum chamber 1105 depending upon whether a composite material is being held against end effector 1100 or removed from end effector 1100.

The illustrations of end effector 400 in FIGS. 4-8, end effector 900 in FIGS. 9-10, and end effector 1100 in FIGS. 11-12 are not meant to imply architectural limitations as to the manner in which different illustrative embodiments may be implemented. Any desirable quantity of pressure ports, plurality of vacuum ports, or vacuum source interfaces may be present in an illustrative example. A plurality of vacuum ports may have any desirable density, shape, location, or size.

The different components shown in FIG. 1 and FIGS. 3-12 may be combined with components in FIG. 2, used with components in FIG. 2, or a combination of the two. Additionally, some of the components in FIG. 1 and FIGS. 3-12 may be illustrative examples of how components shown in block form in FIG. 2 may be implemented as physical structures.

Figure 13:
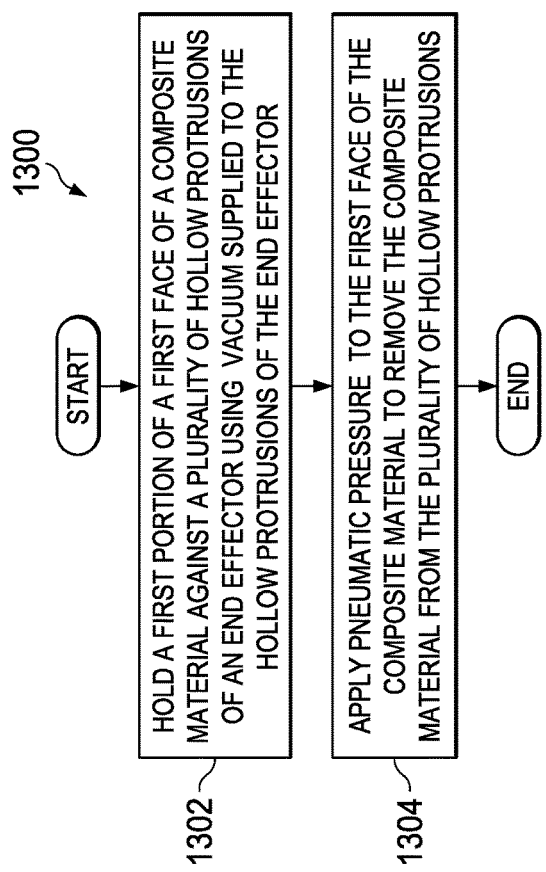
FIG. 13 is an illustration of a flowchart of a method for picking and placing a composite material in accordance with an illustrative embodiment.

Turning now to FIG. 13, an illustration of a flowchart of a method for picking and placing a composite material is depicted in accordance with an illustrative embodiment. Method 1300 may be a method of moving composite material 242 using end effector 202 of FIG. 2. Method 1300 may be a method of using any of end effector 400 of FIG. 4, end effector 900 of FIG. 9, or end effector 1100 of FIG. 11. Method 1300 may be a method of assembling a portion of aircraft 100 of FIG. 1.

Method 1300 holds a first portion of a first face of a composite material against a plurality of hollow protrusions of an end effector using a vacuum supplied to the hollow protrusions of the end effector (operation 1302). Method 1300 applies pneumatic pressure to the first face of the composite material to remove the composite material from the plurality of hollow protrusions s (operation 1304). Afterwards, the method terminates.

In some illustrative examples, applying pneumatic pressure to the first face of the composite material comprises supplying a pneumatic pressure from a pressure port of the end effector to a second portion of the first face of the composite material. In some illustrative examples, a surface area of the first portion is smaller than a surface area of the second portion. Increasing the difference in size between the first portion and the second portion changes the ease of removing the composite material from the plurality of vacuum ports. For example, when the second portion is larger than the first portion, the ease of removing the composite material is greater than when the second portion is not larger than the first portion.

In some illustrative examples, the pneumatic pressure compacts the composite material against a surface of a layup structure. To compact the composite material against the surface of the layup structure, the area of the second portion is sufficient to remove or prevent air between the composite material and the surface of the layup structure.

Figure 14A:
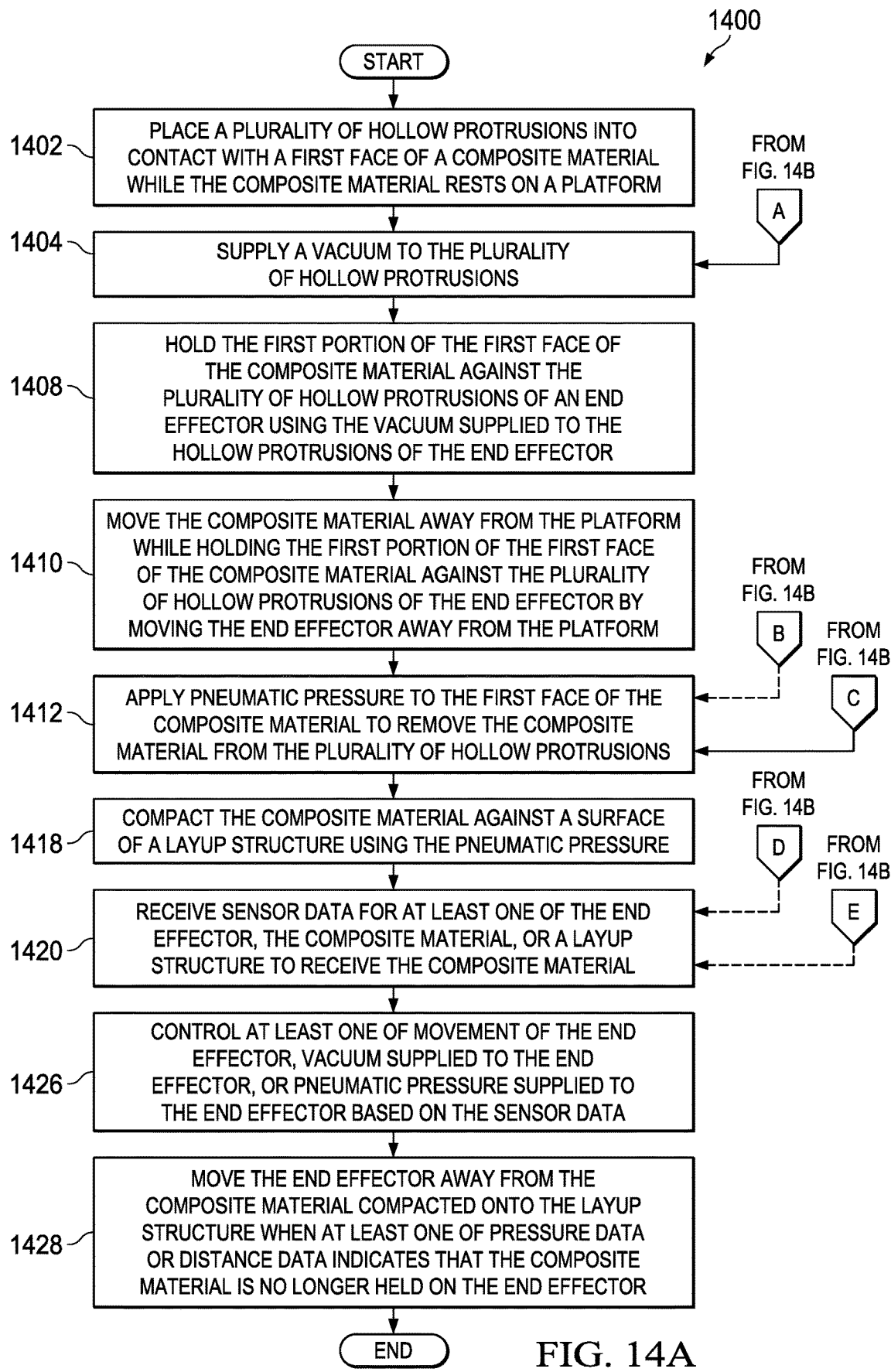
FIGS. 14A and 14B are an illustration of a flowchart of a method for picking and placing a composite material in accordance with an illustrative embodiment.
Figure 14B:
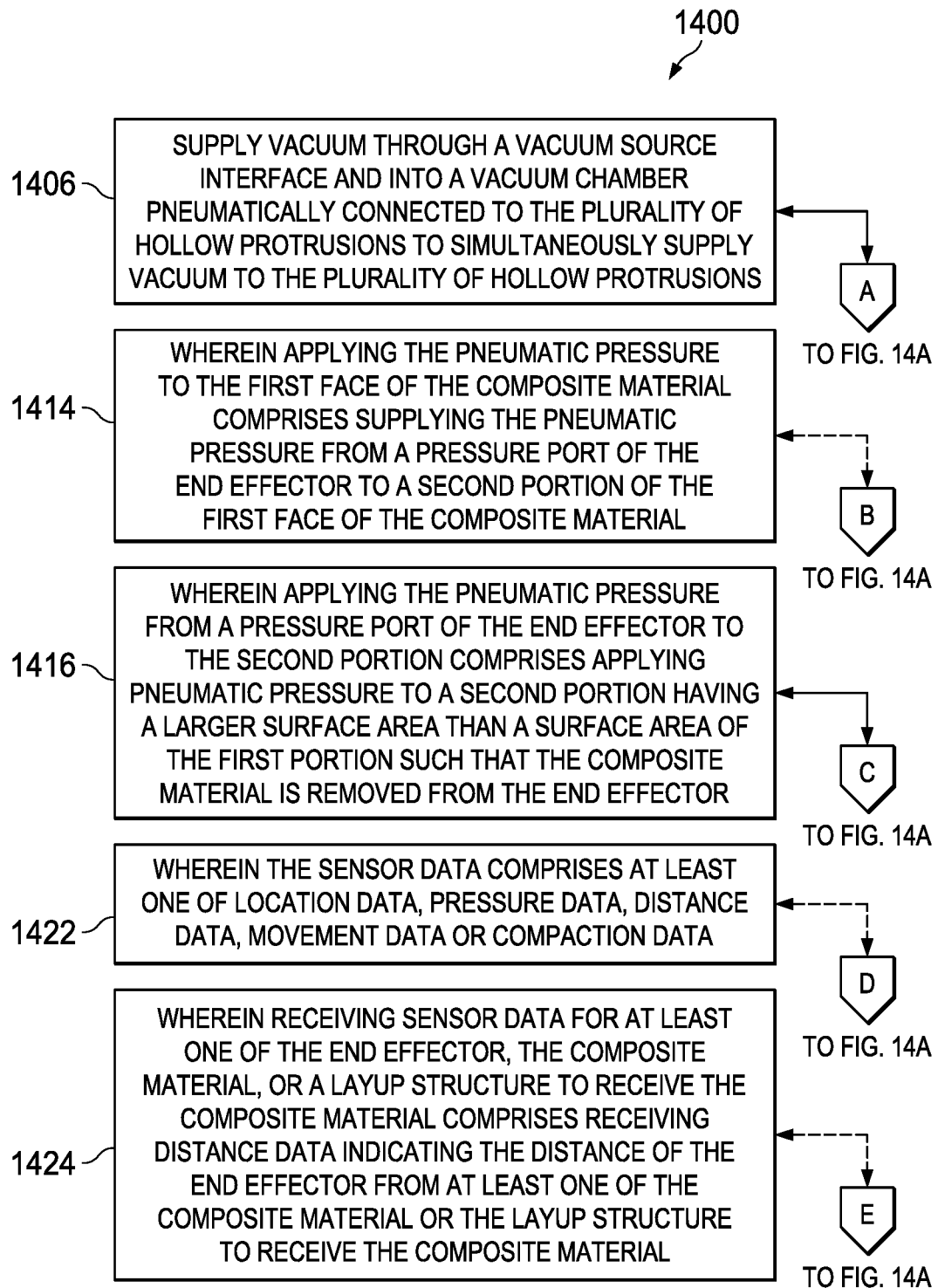

Turning now to FIGS. 14A and 14B, an illustration of a flowchart of a method for picking and placing a composite material is depicted in accordance with an illustrative embodiment. Method 1400 may be a method of moving composite material 242 using end effector 202 of FIG. 2. Method 1400 may be a method of using any of end effector 400 of FIG. 4, end effector 900 of FIG. 9, or end effector 1100 of FIG. 11. Method 1400 may be a method of assembling a portion of aircraft 100 of FIG. 1. Method 1400 includes optional blocks with functions that may not be performed.

Method 1400 places a plurality of hollow protrusions into contact with a first face of a composite material while the composite material rests on a platform (operation 1402). Method 1400 supplies a vacuum to the plurality of hollow protrusions (operation 1404). In some illustrative examples, in method 1400, the vacuum is supplied through a vacuum source interface and into a vacuum chamber pneumatically connected to the plurality of hollow protrusions to simultaneously supply a vacuum to the plurality of hollow protrusions (operation 1406).

Method 1400 holds the first portion of the first face of the composite material against the plurality of hollow protrusions of an end effector using the vacuum supplied to the hollow protrusions of the end effector (operation 1408). Method 1400 moves the composite material away from the platform while holding the first portion of the first face of the composite material against the plurality of hollow protrusions of the end effector by moving the end effector away from the platform (operation 1410). Method 1400 applies pneumatic pressure to the first face of the composite material to remove the composite material from the plurality of hollow protrusions (operation 1412).

In some illustrative examples, method 1400 applying the pneumatic pressure to the first face of the composite material comprises supplying the pneumatic pressure from a pressure port of the end effector to a second portion of the first face of the composite material (operation 1414). In some illustrative examples in method 1400, applying the pneumatic pressure from a pressure port of the end effector to the second portion comprises applying pneumatic pressure to a second portion having a larger surface area than a surface area of the first portion such that the composite material is removed from the end effector (operation 1416). Method 1400 compacts the composite material against a surface of a layup structure using the pneumatic pressure (operation 1418).

Method 1400 receives sensor data for at least one of the end effector, the composite material, or a layup structure to receive the composite material (operation 1420). In some illustrative examples in method 1400 the sensor data comprises at least one of location data, pressure data, distance data, movement data, or compaction data (operation 1422). In some illustrative examples in method 1400, receiving sensor data for at least one of the end effector, the composite material, or a layup structure to receive the composite material comprises receiving distance data indicating the distance of the end effector from at least one of the composite material or the layup structure to receive the composite material (operation 1424).

Method 1400 controls at least one of movement of the end effector, the vacuum supplied to the end effector, or pneumatic pressure supplied to the end effector based on the sensor data (operation 1426). Method 1400 moves the end effector away from the composite material compacted onto the layup structure when at least one of pressure data or distance data indicates that the composite material is no longer held on the end effector (operation 1428).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, method 1300 further comprises placing the plurality of hollow protrusions into contact with the first face of the composite material while the composite material rests on a platform, supplying the vacuum to the plurality of hollow protrusions, and moving the composite material away from the platform while holding the first portion of the first face of the composite material against the plurality of hollow protrusions of the end effector by moving the end effector away from the platform.

In some illustrative examples, method 1300 further comprises receiving sensor data for at least one of the end effector, the composite material, or a layup structure to receive the composite material; and controlling at least one of movement of the end effector, the vacuum supplied to the end effector, or pneumatic pressure supplied to the end effector based on the sensor data. In some illustrative examples, the sensor data comprises at least one of location data, pressure data, distance data, movement data, or compaction data.

In some illustrative examples, distance data indicates the distance of the end effector from at least one of the composite material or the layup structure to receive the composite material. For example, a number of sensors generates the distance data of the end effector from the composite material as the end effector is lowered towards the composite material to pick up the composite material. In another example, the number of sensors generates the distance data of the end effector from the composite material as the composite material is placed onto a layup structure. In one example, the number of sensors generates the distance data of the end effector from the composite material as the end effector moves away from the composite material and the layup structure.

In some illustrative examples, the number of sensors may detect the presence of the composite material when the composite material is held on the end effector. In some illustrative examples, the number of sensors may detect the amount of pressure applied to the composite material as pressure data. In some illustrative examples, the end effector is moved away from the composite material compacted onto the layup structure when at least one of the pressure data or the distance data indicates that the composite material is no longer held on the end effector.

Figure 15:
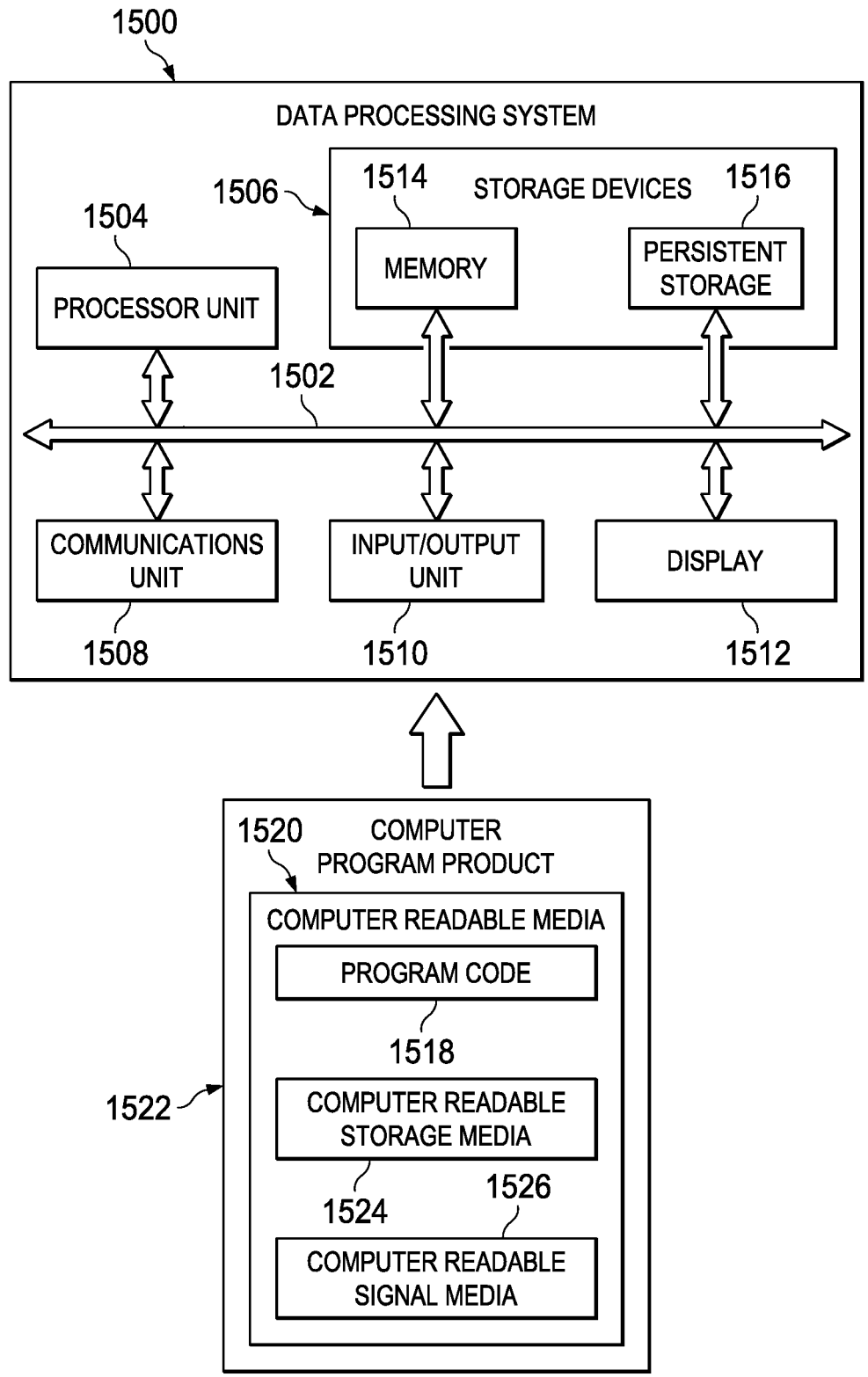
FIG. 15 is an illustration of a data processing system in the form of a block diagram in accordance with an illustrative embodiment.

Turning now to FIG. 15, an illustration of a data processing system in the form of a block diagram is depicted in accordance with an illustrative embodiment. Data processing system 1500 may be used to implement controller 294 of FIG. 2. As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise a number of processors, a multi-processor core, and/or some other suitable type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications, and/or programs run by processor unit 1504 may be located in storage devices 1506. Storage devices 1506 may be in communication with processor unit 1504 through communications framework 1502. As used herein, a storage device, also referred to as a computer-readable storage device, is any piece of hardware capable of storing information on a temporary and/or permanent basis. This information may include, but is not limited to, data, a program code, and/or other types of information.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory drive, a rewritable optical disk, a rewritable magnetic tape, or some combination of the above. The media used by persistent storage 1516 may or may not be removable.

Communications unit 1508 allows data processing system 1500 to communicate with other data processing systems and/or devices. Communications unit 1508 may provide communications using physical and/or wireless communications links.

Input/output unit 1510 allows input to be received from, and output to be sent to other devices connected to data processing system 1500. For example, input/output unit 1510 may allow user input to be received through a keyboard, a mouse, and/or some other type of input device. As another example, input/output unit 1510 may allow output to be sent to a printer connected to data processing system 1500.

Display 1512 is configured to display information to a user. Display 1512 may comprise, for example, without limitation, a monitor, a touch screen, a laser display, a holographic display, a virtual display device, and/or some other type of display device.

In this illustrative example, the processes of the different illustrative embodiments may be performed by processor unit 1504 using computer-implemented instructions. These instructions may be referred to as a program code, a computer-usable program code, or a computer-readable program code, and may be read and executed by one or more processors in processor unit 1504.

In these examples, program code 1518 is located in a functional form on computer-readable media 1520, which is selectively removable, and may be loaded onto or transferred to data processing system 1500 for execution by processor unit 1504. Program code 1518 and computer-readable media 1520 together form computer program product 1522. In this illustrative example, computer-readable media 1520 may be computer-readable storage media 1524 or computer-readable signal media 1526.

Computer-readable storage media 1524 is a physical or tangible storage device used to store program code 1518, rather than a medium that propagates or transmits program code 1518. Computer-readable storage media 1524 may be, for example, without limitation, an optical or magnetic disk, or a persistent storage device that is connected to data processing system 1500.

Alternatively, program code 1518 may be transferred to data processing system 1500 using computer-readable signal media 1526. Computer-readable signal media 1526 may be, for example, a propagated data signal containing program code 1518. This data signal may be an electromagnetic signal, an optical signal, and/or some other type of signal that can be transmitted over physical and/or wireless communications links.

The illustration of data processing system 1500 in FIG. 15 is not meant to provide architectural limitations to the manner in which the illustrative embodiments may be implemented. The different illustrative embodiments may be implemented in a data processing system that includes components, in addition to or in place of those illustrated, for data processing system 1500. Further, components shown in FIG. 15 may be varied from the illustrative examples shown.

Figure 16:
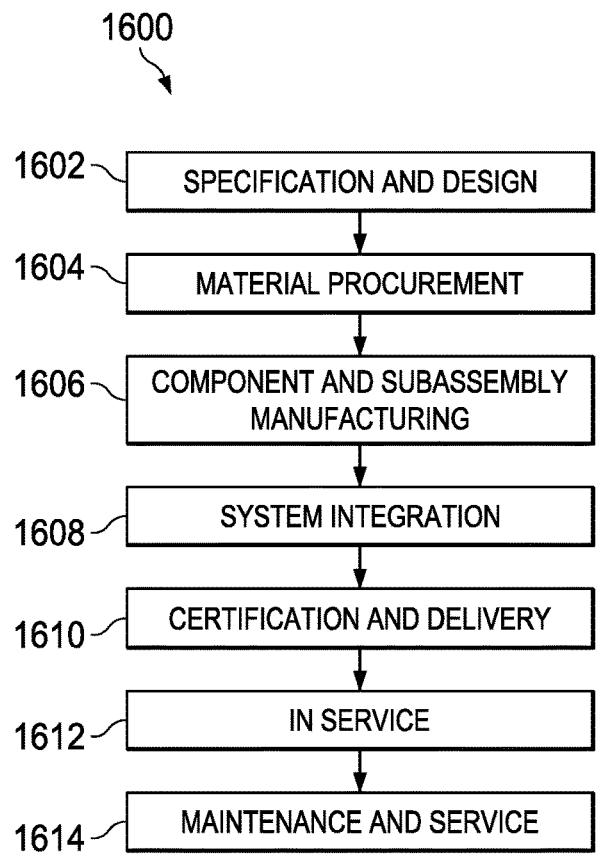
FIG. 16 is an illustration of an aircraft manufacturing and service method in the form of a block diagram in accordance with an illustrative embodiment.
Figure 17:
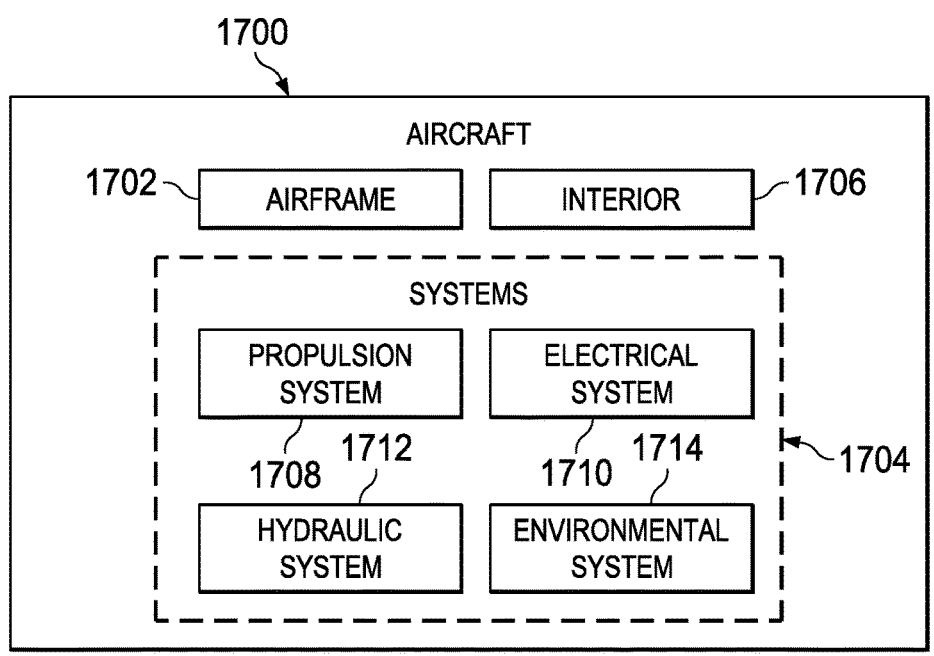
FIG. 17 is an illustration of an aircraft in the form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 1606, system integration 1608, or maintenance and service 1614 of FIG. 16. For example, end effector 202 of FIG. 2 may be used during component and subassembly manufacturing 1606 to lay up composite material 242 of FIG. 2. Composite material 242 of FIG. 2 may be laid during component and subassembly manufacturing 1606 using method 1300 of FIG. 13 or method 1400 of FIGS. 14A and 14B. End effector 202 of FIG. 2 may lay up composite material 242 of FIG. 2 during system integration 1608. End effector 202 of FIG. 2 may be used to form replacement components used during maintenance and service 1614 of FIG. 16.

Composite material 242 of FIG. 2 may be laid using end effector 202 of FIG. 2 to form a portion of airframe 1702. In some illustrative examples, composite material 242 of FIG. 2 may be laid using end effector 202 of FIG. 2 to form a portion of interior 1706.

The illustrative examples present an end effector configured to handle sticky prepreg composite tape to allow the pick and place of individual pieces which is not conventionally done in the industry. Conventionally, composite prepreg tape is laid down from a roll.

The plurality of hollow protrusions of an illustrative example may resemble straws when the hollow protrusions are substantially cylindrical. The "straws," or hollow protrusions, allow minimum surface area for the tape to stick to, but enough holding force to pick up the piece.

The amount of force that can be applied by air pressure to put the composite prepreg tape down is significantly more than what was used to hold it. In comparing surface area of edge of each "straw", or hollow protrusion, it can be seen that the surrounding area is greater.

Having a greater pressure area allows the end effector to place graphite tape where it is desired and not have it stick to a conventional vacuum cup. The greater pressure area allows the composite prepreg tape to stick to the other composite prepreg tape upon laydown.

The illustrative examples provide a plurality of hollow protrusions, which may be referred to as an array of "straw-like" tubes. The ends of the hollow protrusions touch the work piece. The vacuum comes through the straws but not in the space surrounding the straws. The space surrounding the straws can be pressurized after the tape has been placed in the desired location.

The end effector has a specially designed interface for picking and placing a carbon fiber sheet or other sticky material. The specially designed interface allows a vacuum to be pulled to move the carbon fiber sheet, but with minimal surface area contact that then allows for a pressure to be subsequently applied helping to remove the sticky prepreg from the vacuum interface.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
holding a first portion of a first face of composite material against a plurality of hollow protrusions of an end effector using a vacuum supplied to the plurality of hollow protrusions of the end effector, wherein the plurality of hollow protrusions extend from a face of the end effector and form a plurality of vacuum ports connected to a vacuum chamber receiving the vacuum from a vacuum source interface formed in a first wall of the end effector, wherein the vacuum source interface and the plurality of vacuum ports are both in fluid communication with the vacuum chamber, wherein the vacuum chamber is formed by the first wall, the face, and a lip in contact with both the first wall and the face of the end effector; and
applying pneumatic pressure to the first face of the composite material to remove the composite material from the plurality of hollow protrusions with a pressure envelope separated from the vacuum chamber by the face of the end effector and formed between the face of the end effector and the first face of the composite material, wherein ends of the plurality of hollow protrusions are flush with an end of the lip extending from the face of the end effector.

2. The method of claim 1, further comprising:
supplying the vacuum through the vacuum source interface and into the vacuum chamber pneumatically connected to the plurality of hollow protrusions to simultaneously supply the vacuum to the plurality of hollow protrusions.

3. The method of claim 1, wherein applying the pneumatic pressure to the first face of the composite material comprises supplying the pneumatic pressure from a pressure port of the end effector to a second portion of the first face of the composite material.

4. The method of claim 3, wherein applying the pneumatic pressure from the pressure port of the end effector to the second portion comprises applying the pneumatic pressure to a second portion having a larger surface area than a surface area of the first portion such that the composite material is removed from the end effector.

5. The method of claim 3, further comprising:
compacting the composite material against a surface of a layup structure using the pneumatic pressure.

6. The method of claim 1 further comprising:
placing the plurality of hollow protrusions into contact with the first face of the composite material while the composite material rests on a platform;
supplying the vacuum to the plurality of hollow protrusions; and
moving the composite material away from the platform while holding the first portion of the first face of the composite material against the plurality of hollow protrusions of the end effector by moving the end effector away from the platform.

7. The method of claim 1 further comprising: receiving sensor data for at least one of the end effector, the composite material, or a layup structure to receive the composite material; and controlling at least one of movement of the end effector, the vacuum supplied to the end effector, or the pneumatic pressure supplied to the end effector based on the sensor data.

8. The method of claim 7 wherein the sensor data comprises at least one of location data, pressure data, distance data, movement data, or compaction data.

9. The method of claim 8, further comprising:
moving the end effector away from the composite material compacted onto the layup structure when at least one of the pressure data or the distance data indicates that the composite material is no longer held on the end effector.

10. The method of claim 8, wherein receiving sensor data for at least one of the end effector, the composite material, or the layup structure to receive the composite material comprises receiving the distance data indicating a distance of the end effector from at least one of the composite material or the layup structure to receive the composite material.

11. An end effector comprising:
a vacuum source interface formed in a first wall and in fluid communication with a vacuum chamber;
a plurality of vacuum ports formed from a plurality of hollow protrusions extending from a second wall, the plurality of vacuum ports in fluid communication with the vacuum chamber;
the vacuum chamber formed by the first wall, the second wall, and a lip, wherein the lip contacts both the first wall and the second wall, and wherein the plurality of vacuum ports is connected to the vacuum chamber receiving a vacuum from the vacuum source interface; and
a pressure envelope separated from the vacuum chamber by the second wall and configured to apply pneumatic pressure to a composite material such that the composite material is separated from the end effector, wherein ends of the plurality of hollow protrusions are flush with an end of the lip extending from the second wall.

12. The end effector of claim 11 further comprising:
a pressure port configured to supply the pneumatic pressure between the plurality of vacuum ports when the composite material is contacting the plurality of vacuum ports.

13. The end effector of claim 11, wherein the pressure envelope comprises the second wall and the lip, wherein the lip surrounds the plurality of vacuum ports.

14. The end effector of claim 12, wherein the pressure port is formed by a tube extending through the vacuum chamber.

15. The end effector of claim 11, wherein a pressure area of the pressure envelope is greater than a vacuum area of the plurality of vacuum ports.

16. The end effector of claim 11, wherein a pressure area of the pressure envelope is greater than a contact area of the end effector.

17. The end effector of claim 12 further comprising:
a pressure source interface configured to supply the pneumatic pressure to the pressure port.

18. The end effector of claim 11, wherein each of the plurality of vacuum ports is substantially cylindrical.

19. The end effector of claim 11, wherein the plurality of hollow protrusions extends sufficiently away from the second wall such that the composite material does not contact the second wall when the composite material is held against the plurality of hollow protrusions.

20. The end effector of claim 11, wherein the plurality of hollow protrusions are portions of a monolithic second structure, wherein the monolithic second structure forms the second wall of the vacuum chamber opposite the first wall.

21. The end effector of claim 20, wherein the monolithic second structure is configured to form the pressure envelope with the composite material when the composite material is held against the plurality of hollow protrusions.

22. The end effector of claim 21, wherein the vacuum source interface is a portion of a monolithic first structure, wherein the monolithic first structure forms the first wall of the vacuum chamber.

23. The end effector of claim 11 further comprising a number of sensors configured to generate at least one of location data, pressure data, distance data, movement data, or compaction data.

24. A system configured to lift composite material, the system comprising:
a robotic arm; and
an end effector connected to the robotic arm, the end effector comprising:
a vacuum source interface formed in a first wall and in fluid communication with a vacuum chamber;
a plurality of vacuum ports formed from a plurality of hollow protrusions extending from a second wall, the plurality of vacuum ports in fluid communication with the vacuum chamber;
the vacuum chamber formed by the first wall, the second wall, and a lip, wherein the lip contacts both the first wall and the second wall, and wherein the plurality of vacuum ports is connected to the vacuum chamber receiving a vacuum from the vacuum source interface; and
a pressure envelope separated from the vacuum chamber by the second wall and configured to apply pneumatic pressure to the composite material such that the composite material is separated from the end effector, wherein ends of the plurality of hollow protrusions are flush with an end of the lip extending from the second wall.

25. The system of claim 24, wherein the end effector further comprises a pressure port configured to supply the pneumatic pressure between the plurality of vacuum ports when the composite material is contacting the plurality of vacuum ports.

26. The system of claim 25, wherein the pneumatic pressure supplied by the pressure port is sufficient to remove the composite material from the plurality of vacuum ports after stopping the vacuum.

27. The system of claim 25, wherein the pneumatic pressure supplied by the pressure port is sufficient to compact the composite material onto a surface of a layup structure.

28. The system of claim 25, wherein the pneumatic pressure is supplied to the pressure envelope having a pressure area greater than a vacuum area of the plurality of vacuum ports.

29. The system of claim 25, wherein the pneumatic pressure is supplied to the pressure envelope having a pressure area greater than a contact area of the end effector.

30. The system of claim 25 further comprising:
   a number of sensors configured to generate sensor data comprising at least one of location data, pressure data, distance data, movement data, or compaction data.

31. The system of claim 30 further comprising:
   a controller configured to control at least one of movement of the end effector, vacuum supplied to the end effector, or pneumatic pressure supplied to the end effector based on the sensor data.

32. The system of claim 24, wherein the vacuum supplied to the vacuum source interface is sufficient to lift the composite material.

* * * * *